US012640167B2

(12) United States Patent
Nakao et al.

(10) Patent No.: US 12,640,167 B2
(45) Date of Patent: May 26, 2026

(54) MAGNETIC TAPE DRIVE, MAGNETIC TAPE CARTRIDGE, AND INFORMATION MANAGEMENT METHOD

(71) Applicant: FUJIFILM CORPORATION, Tokyo (JP)

(72) Inventors: Toru Nakao, Kanagawa (JP); Hodaka Suzuki, Kanagawa (JP); Yoichi Akano, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 19/096,736

(22) Filed: Apr. 1, 2025

(65) Prior Publication Data

US 2025/0259649 A1 Aug. 14, 2025

Related U.S. Application Data

(63) Continuation of application No. PCT/JP2023/036434, filed on Oct. 5, 2023.

(30) Foreign Application Priority Data

Oct. 14, 2022 (JP) ................................. 2022-165744

(51) Int. Cl.
*G11B 5/00* (2006.01)
*G11B 5/008* (2006.01)
*G11B 5/584* (2006.01)

(52) U.S. Cl.
CPC .......... *G11B 5/584* (2013.01); *G11B 5/00813* (2013.01)

(58) Field of Classification Search
CPC ..... G11B 5/5925; G11B 5/4513; G11B 5/584; G11B 5/0056; G11B 20/1833;
(Continued)

(56) References Cited

U.S. PATENT DOCUMENTS 11,120,832 B2 * 9/2021 Nakao ................ G11B 5/00813
2016/0225402 A1 8/2016 Hikita
(Continued)

FOREIGN PATENT DOCUMENTS

JP 2002-216457 A 8/2002
JP 2016-143434 A 8/2016
(Continued)

OTHER PUBLICATIONS

International Search Report issued in International Application No. PCT/JP2023/036434 on Dec. 19, 2023.
(Continued)

*Primary Examiner* — Nabil Z Hindi
(74) *Attorney, Agent, or Firm* — SOLARIS Intellectual Property Group, PLLC

(57) ABSTRACT

A magnetic tape drive is used for a magnetic tape cartridge including a magnetic tape and a storage medium. Geometrical characteristic information is stored in the storage medium. The geometrical characteristic information is recorded on the magnetic tape. A processor of a magnetic tape drive erases first geometrical characteristic information from the storage medium to leave second geometrical characteristic information in the storage medium. The second geometrical characteristic information is geometrical characteristic information capable of specifying a recording position in the magnetic tape at which the geometrical characteristic information is recorded. The first geometrical characteristic information is geometrical characteristic information other than the second geometrical characteristic information.

16 Claims, 21 Drawing Sheets

(58) Field of Classification Search
CPC ........ G11B 5/00878; G11B 2020/1275; G11B
5/41; G11B 20/1211; G11B 27/36; G11B
15/46; G11B 5/012; G11B 5/09; G11B
5/59677; G11B 5/71; G11B 5/00813;
G11B 5/5508; G11B 15/087; G11B 33/04
USPC ......................................................... 360/48
See application file for complete search history.

(56) References Cited

U.S. PATENT DOCUMENTS

| | | |
|---|---|---|
| 2019/0074031 A1 | 3/2019 | Akano |
| 2021/0090597 A1 | 3/2021 | Akano |
| 2021/0098018 A1 | 4/2021 | Nakao et al. |
| 2021/0343312 A1 | 11/2021 | Nakao et al. |

FOREIGN PATENT DOCUMENTS

| | | |
|---|---|---|
| JP | 2019-046521 A | 3/2019 |
| JP | 2021-051821 A | 4/2021 |

OTHER PUBLICATIONS

Written Opinion of the ISA issued in International Application No. PCT/JP2023/036434 on Dec. 19, 2023.

\* cited by examiner

MANAGEMENT INFORMATION

FIG. 9

FIG. 12
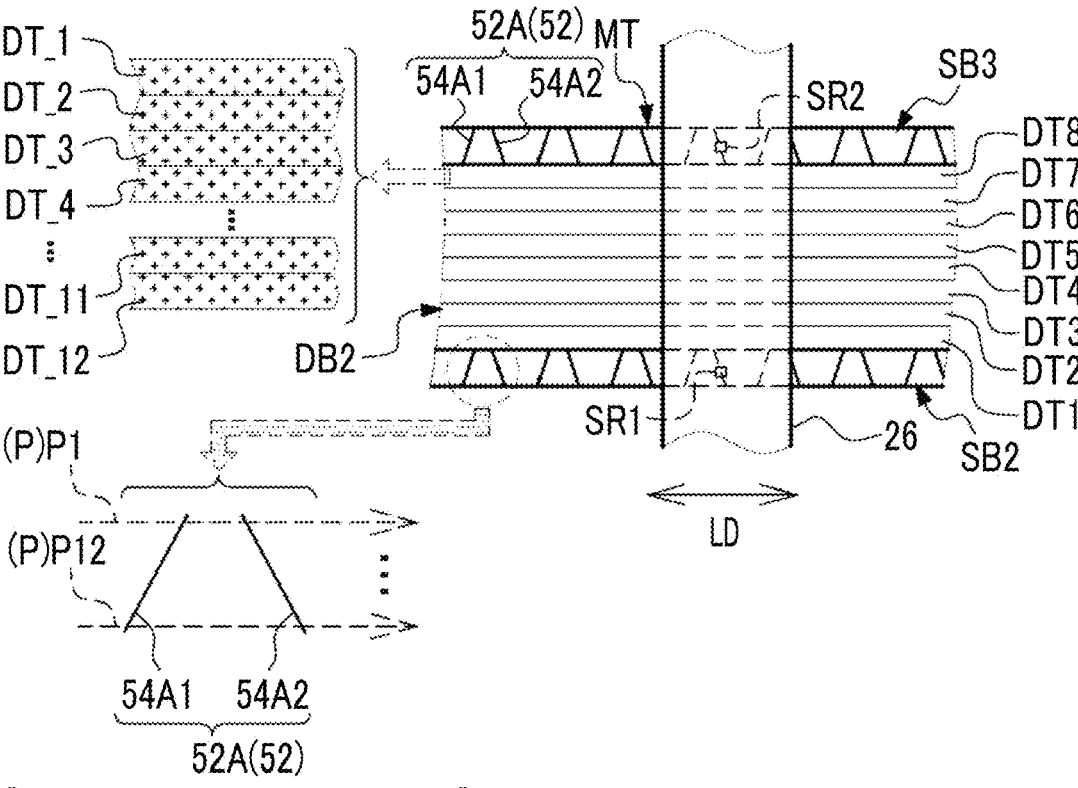
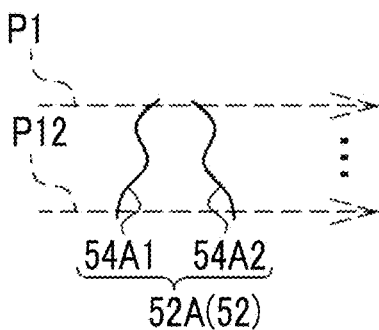
[EXAMPLE OF IDEAL SERVO PATTERN]
[FIRST EXAMPLE OF ACTUAL SERVO PATTERN]
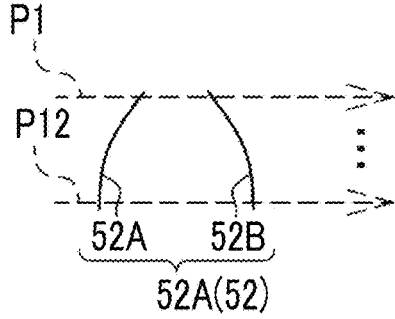
[SECOND EXAMPLE OF ACTUAL SERVO PATTERN]

FIG. 18

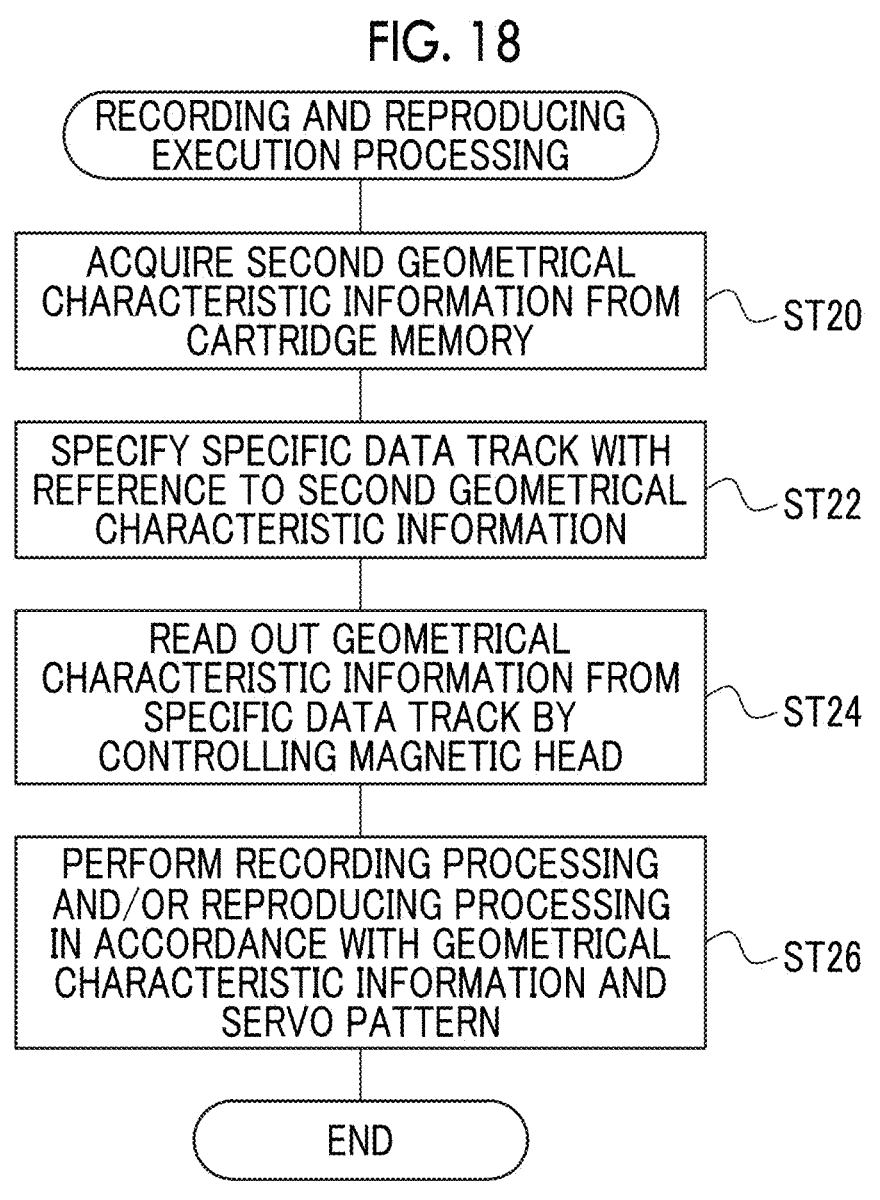

RECORDING AND REPRODUCING
EXECUTION PROCESSING

ACQUIRE SECOND GEOMETRICAL
CHARACTERISTIC INFORMATION FROM
CARTRIDGE MEMORY  ∼ST20

SPECIFY SPECIFIC DATA TRACK WITH
REFERENCE TO SECOND GEOMETRICAL
CHARACTERISTIC INFORMATION  ∼ST22

READ OUT GEOMETRICAL
CHARACTERISTIC INFORMATION FROM
SPECIFIC DATA TRACK BY
CONTROLLING MAGNETIC HEAD  ∼ST24

PERFORM RECORDING PROCESSING
AND/OR REPRODUCING PROCESSING
IN ACCORDANCE WITH GEOMETRICAL
CHARACTERISTIC INFORMATION AND
SERVO PATTERN  ∼ST26

END

1

MAGNETIC TAPE DRIVE, MAGNETIC TAPE CARTRIDGE, AND INFORMATION MANAGEMENT METHOD

CROSS-REFERENCE TO RELATED APPLICATIONS

This application is a continuation application of International Application No. PCT/JP2023/036434, filed Oct. 5, 2023, the disclosure of which is incorporated herein by reference in its entirety. Further, this application claims priority from Japanese Patent Application No. 2022-165744, filed Oct. 14, 2022, the disclosure of which is incorporated herein by reference in its entirety.

BACKGROUND

1. Technical Field

The technology of the present disclosure relates to a magnetic tape drive, a magnetic tape cartridge, and an information management method.

2. Related Art

JP2021-051821A discloses a recording and reproducing apparatus comprises: a reading unit which reads production time information, which is information regarding a magnetic tape acquired in a production process of a magnetic tape cartridge, from a recording medium of the magnetic tape cartridge, which includes the magnetic tape, and the recording medium other than the magnetic tape and in which the production time information is recorded on the recording medium; and a control unit which performs control of recording the production time information on the magnetic tape and invalidating the production time information of the recording medium as an initialization process of the magnetic tape cartridge.

SUMMARY

One embodiment according to the technology of the present disclosure provides a magnetic tape drive, a magnetic tape cartridge, and an information management method capable of specifying a position at which information regarding a geometrical characteristic of a servo pattern is recorded on a magnetic tape, and contributing to an increase in an empty capacity of a storage medium.

A first aspect according to the technology of the present disclosure relates to a magnetic tape drive used for a magnetic tape cartridge including a magnetic tape on which a servo pattern is recorded, and a storage medium other than the magnetic tape, in which information is capable of being stored and acquired in a non-contact manner, the magnetic tape drive comprising: a processor; and a magnetic head controlled by the processor, in which geometrical characteristic information, which is information regarding a geometrical characteristic of the servo pattern, is stored in the storage medium, the processor is configured to: perform control of recording the geometrical characteristic information stored in the storage medium on the magnetic tape by the magnetic head at a position determined in accordance with a reading result of the servo pattern by the magnetic head; and leave second geometrical characteristic information in the storage medium by erasing first geometrical characteristic information from the geometrical characteristic information stored in the storage medium, the second geometrical characteristic information is geometrical characteristic information capable of specifying a recording position in the magnetic tape at which the geometrical characteristic information is recorded, of the geometrical characteristic information stored in the storage medium, and the first geometrical characteristic information is geometrical characteristic information other than the second geometrical characteristic information of the geometrical characteristic information stored in the storage medium.

A second aspect according to the technology of the present disclosure relates to a magnetic tape drive used for a magnetic tape cartridge including a magnetic tape on which a servo pattern is recorded, and a storage medium other than the magnetic tape, in which information is capable of being stored and acquired in a non-contact manner, the magnetic tape drive comprising: a processor; and a magnetic head controlled by the processor, in which geometrical characteristic information, which is information regarding a geometrical characteristic of the servo pattern, is stored in the storage medium, the geometrical characteristic information, which is stored in the storage medium, is recorded in the magnetic tape, the processor is configured to: leave second geometrical characteristic information in the storage medium by erasing first geometrical characteristic information from the geometrical characteristic information stored in the storage medium, the second geometrical characteristic information is geometrical characteristic information capable of specifying a recording position in the magnetic tape at which the geometrical characteristic information is recorded, of the geometrical characteristic information stored in the storage medium, and the first geometrical characteristic information is geometrical characteristic information other than the second geometrical characteristic information of the geometrical characteristic information stored in the storage medium.

A third aspect according to the technology of the present disclosure relates to the magnetic tape drive according to the first aspect or the second aspect, in which the geometrical characteristic information is information regarding a geometrical characteristic of the servo pattern acquired in a production process of the magnetic tape cartridge.

A fourth aspect according to the technology of the present disclosure relates to the magnetic tape drive according to any one of the first to third aspects, in which, in a case where recording processing and/or reproducing processing using the magnetic head is performed on the magnetic tape by the processor in a state in which the first geometrical characteristic information is erased from the storage medium and the second geometrical characteristic information remains in the storage medium, and the processor is configured to: specify the recording position in accordance with the second geometrical characteristic information remaining in the storage medium; perform control of reading out the geometrical characteristic information from the specified recording position by the magnetic head; and perform the recording processing and/or the reproducing processing in accordance with the geometrical characteristic information read out by the magnetic head from the recording position and the servo pattern.

A fifth aspect according to the technology of the present disclosure relates to the magnetic tape drive according to any one of the first to fourth aspects, in which the storage medium has a plurality of storage regions including a first storage region and a second storage region, the geometrical characteristic information is stored in the first storage region, and the processor is configured to: transfer the second geometrical characteristic information from the first storage region to the second storage region.

A sixth aspect according to the technology of the present disclosure is the magnetic tape drive according to the fifth aspect, in which the processor is configured to: erase the first geometrical characteristic information from the first storage region.

A seventh aspect according to the technology of the present disclosure relates to the magnetic tape drive according to the sixth aspect, in which the processor is configured to: erase the first geometrical characteristic information from the first storage region by overwriting the first storage region.

An eighth aspect according to the technology of the present disclosure relates to the magnetic tape drive according to any one of the first to seventh aspects, in which the geometrical characteristic information is information in which linearity of the servo pattern is represented.

A ninth aspect according to the technology of the present disclosure relates to the magnetic tape drive according to any one of the first to eighth aspects, in which the geometrical characteristic information includes information in which first specification information capable of specifying a position in the servo pattern in a width direction of the magnetic tape and second specification information capable of specifying the geometrical characteristic at the position specified from the first specification information are associated with each other.

A tenth aspect according to the technology of the present disclosure relates to the magnetic tape drive according to the ninth aspect, in which the servo pattern is at least one linear magnetization region pair, the linear magnetization region pair is a first linear magnetization region that is linearly magnetized and a second linear magnetization region that is linearly magnetized, the first linear magnetization region and the second linear magnetization region are inclined in opposite directions with respect to an imaginary straight line along the width direction of the magnetic tape, and the second specification information is information indicating an interval between the first linear magnetization region and the second linear magnetization region at a position specified from the first specification information.

An eleventh aspect according to the technology of the present disclosure relates to the magnetic tape drive according to the ninth aspect, in which the servo pattern is at least one linear magnetization region pair, the linear magnetization region pair is a first linear magnetization region that is linearly magnetized and a second linear magnetization region that is linearly magnetized, the first linear magnetization region and the second linear magnetization region are inclined in opposite directions with respect to an imaginary straight line along the width direction of the magnetic tape, and the second specification information is information indicating a deviation amount from a reference interval between the first linear magnetization region and the second linear magnetization region at a position specified from the first specification information.

A twelfth aspect according to the technology of the present disclosure relates to the magnetic tape drive according to any one of the first to eleventh aspects, in which the storage medium selectively stores first information capable of specifying that all of the geometrical characteristic information is stored, and second information capable of specifying that, of the geometrical characteristic information, the first geometrical characteristic information is erased and the second geometrical characteristic information remains.

A thirteenth aspect according to the technology of the present disclosure relates to a magnetic tape cartridge comprising: a magnetic tape on which a servo pattern is recorded; and a storage medium other than the magnetic tape, in which information is capable of being stored and acquired in a non-contact manner, in which geometrical characteristic information, which is information regarding a geometrical characteristic of the servo pattern, is stored in the storage medium, the geometrical characteristic information stored in the storage medium is recorded on the magnetic tape by a magnetic head at a position determined in accordance with a reading result of the servo pattern by the magnetic head, second geometrical characteristic information is left in the storage medium by erasing first geometrical characteristic information from the geometrical characteristic information stored in the storage medium, the second geometrical characteristic information is geometrical characteristic information capable of specifying a recording position in the magnetic tape at which the geometrical characteristic information is recorded, of the geometrical characteristic information stored in the storage medium, and the first geometrical characteristic information is geometrical characteristic information other than the second geometrical characteristic information of the geometrical characteristic information stored in the storage medium.

A fourteenth aspect according to the technology of the present disclosure relates to a magnetic tape cartridge comprising: a magnetic tape on which a servo pattern is recorded; and a storage medium other than the magnetic tape, in which information is capable of being stored and acquired in a non-contact manner, in which geometrical characteristic information, which is information regarding a geometrical characteristic of the servo pattern, is stored in the storage medium, the geometrical characteristic information stored in the storage medium is recorded on the magnetic tape, second geometrical characteristic information is left in the storage medium by erasing first geometrical characteristic information from the geometrical characteristic information stored in the storage medium, the second geometrical characteristic information is geometrical characteristic information capable of specifying a recording position in the magnetic tape at which the geometrical characteristic information is recorded, of the geometrical characteristic information stored in the storage medium, and the first geometrical characteristic information is geometrical characteristic information other than the second geometrical characteristic information of the geometrical characteristic information stored in the storage medium.

A fifteenth aspect according to the technology of the present disclosure relates to an information management method of a magnetic tape cartridge including a magnetic tape on which a servo pattern is recorded, and a storage medium other than the magnetic tape, in which information is capable of being stored and acquired in a non-contact manner, in which geometrical characteristic information which is information regarding a geometrical characteristic of the servo pattern, is stored in the storage medium, the information management method comprising: performing control of recording the geometrical characteristic information stored in the storage medium on the magnetic tape by a magnetic head at a position determined in accordance with a reading result of the servo pattern by the magnetic head; and leaving second geometrical characteristic information in the storage medium by erasing first geometrical characteristic information from the geometrical characteristic information stored in the storage medium, wherein the second geometrical characteristic information is geometrical characteristic information capable of specifying a recording position in the magnetic tape at which the geometrical characteristic information is recorded, of the geometrical characteristic information stored in the storage medium, and the first geometrical characteristic information is geometrical characteristic information other than the second geometrical characteristic information of the geometrical characteristic information stored in the storage medium.

A sixteenth aspect according to the technology of the present disclosure is an information management method of a magnetic tape cartridge including a magnetic tape on which a servo pattern is recorded, and a storage medium other than the magnetic tape, in which information is capable of being stored and acquired in a non-contact manner, in which geometrical characteristic information which is information regarding a geometrical characteristic of the servo pattern, is stored in the storage medium, the information management method comprising: recording, on the magnetic tape, the geometrical characteristic information stored in the storage medium; and leaving second geometrical characteristic information in the storage medium by erasing first geometrical characteristic information from the geometrical characteristic information stored in the storage medium, in which the second geometrical characteristic information is geometrical characteristic information capable of specifying a recording position in the magnetic tape at which the geometrical characteristic information is recorded, of the geometrical characteristic information stored in the storage medium, and the first geometrical characteristic information is geometrical characteristic information other than the second geometrical characteristic information of the geometrical characteristic information stored in the storage medium.

BRIEF DESCRIPTION OF THE DRAWINGS

Exemplary embodiments according to the technique of the present disclosure will be described in detail based on the following figures, wherein:

FIG. 9 is a conceptual diagram showing an example of an aspect in which a servo pattern is read;

6

Figure 11:
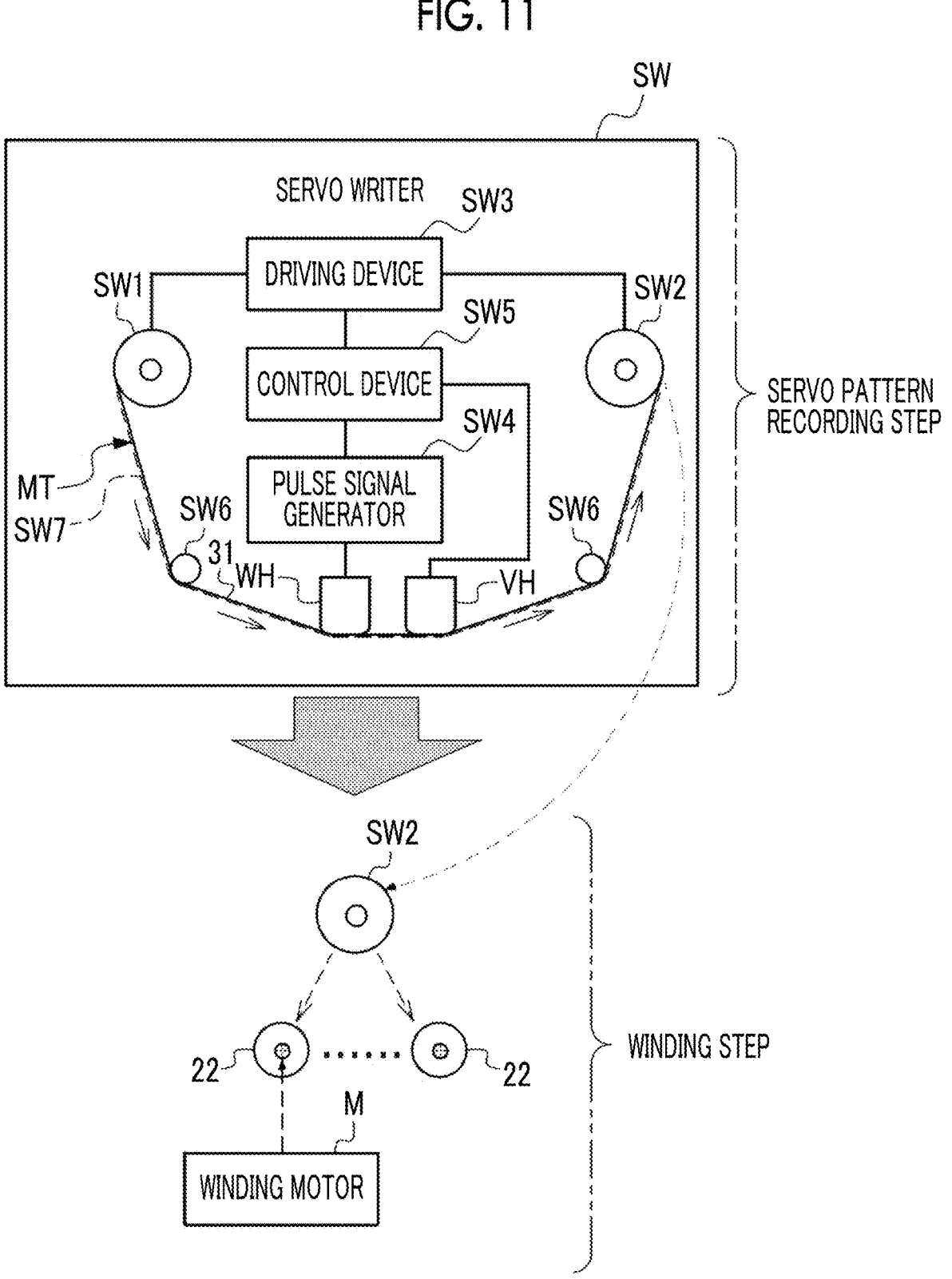
Figure 13:
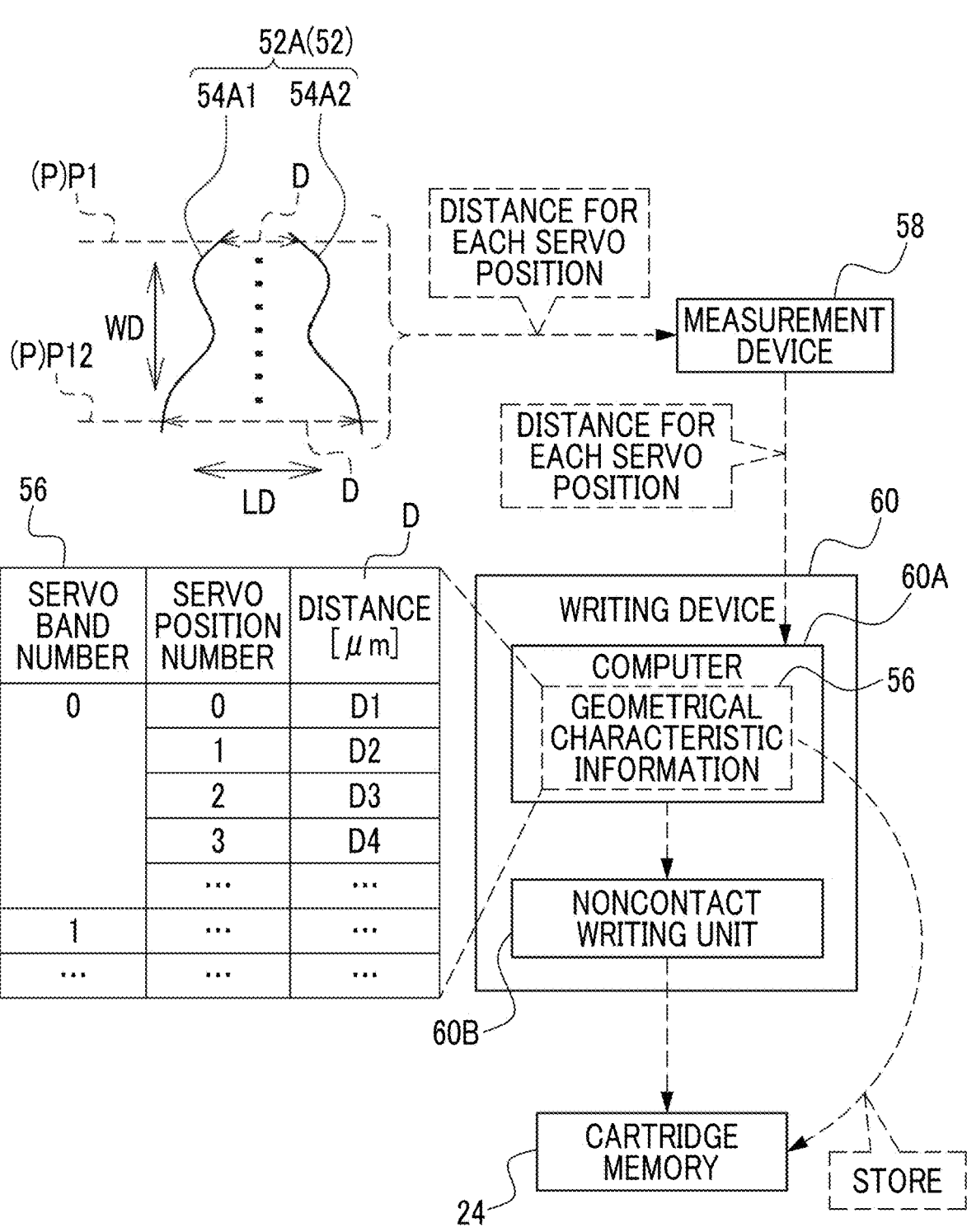
Figure 14:
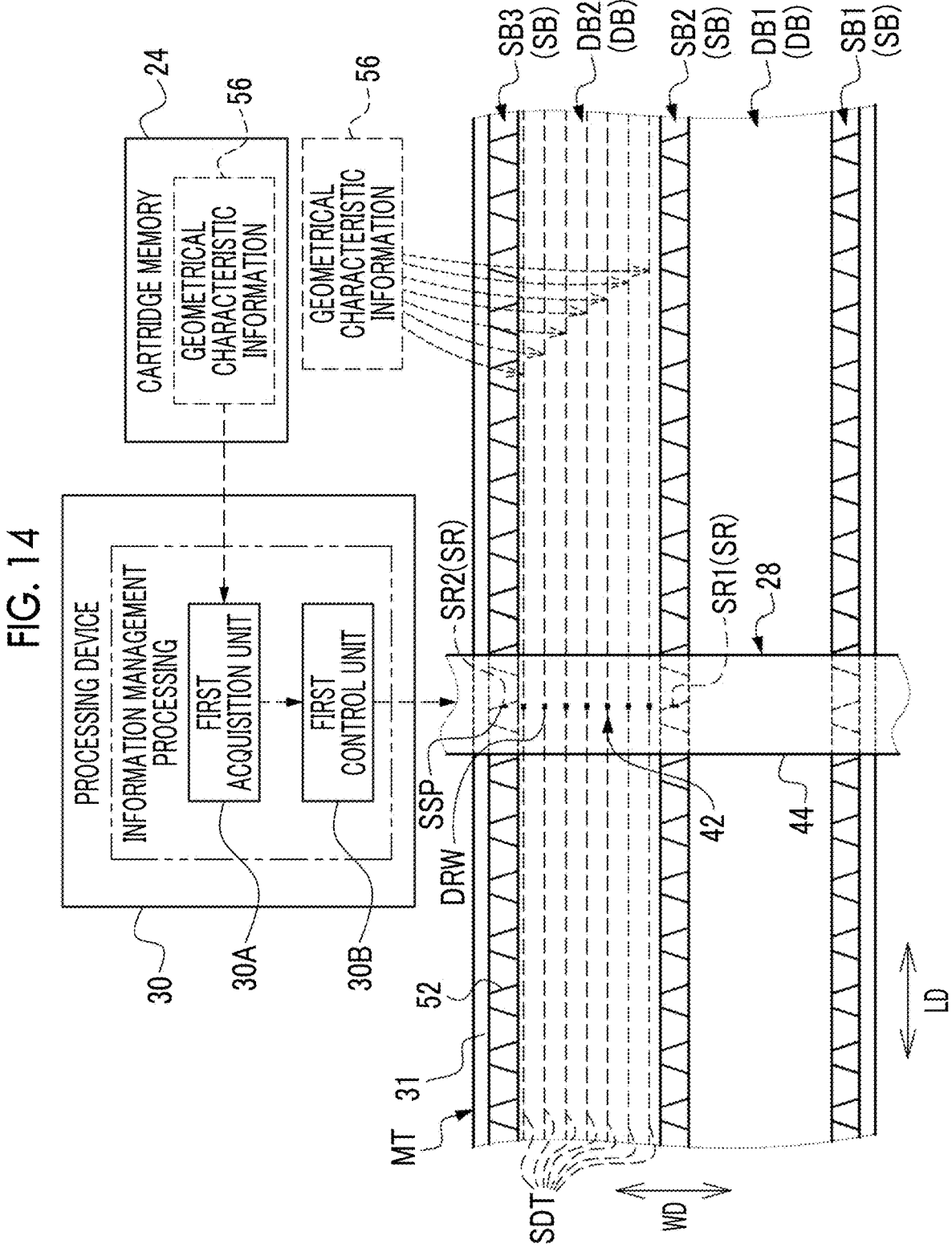
Figure 15:
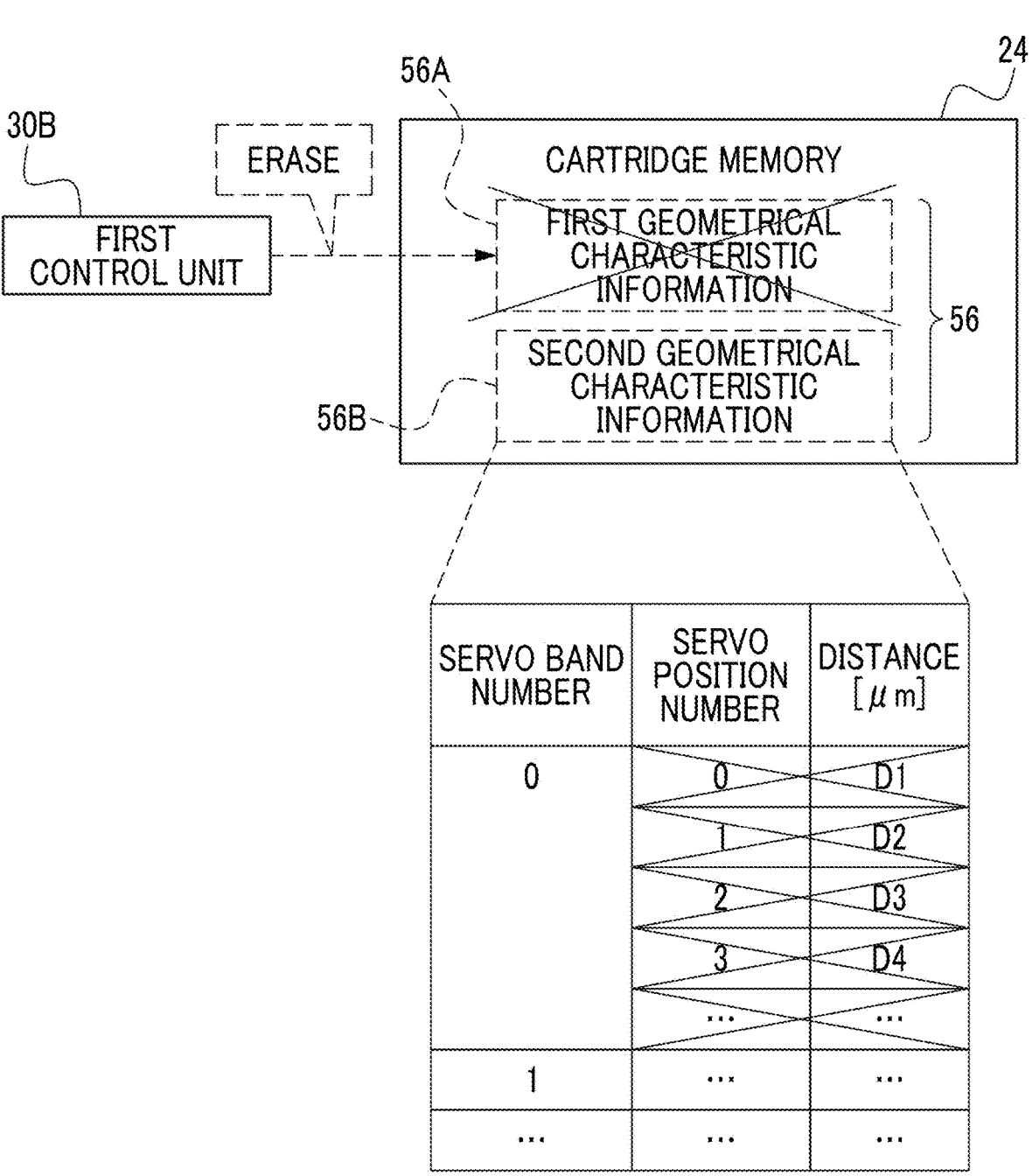
Figure 16:
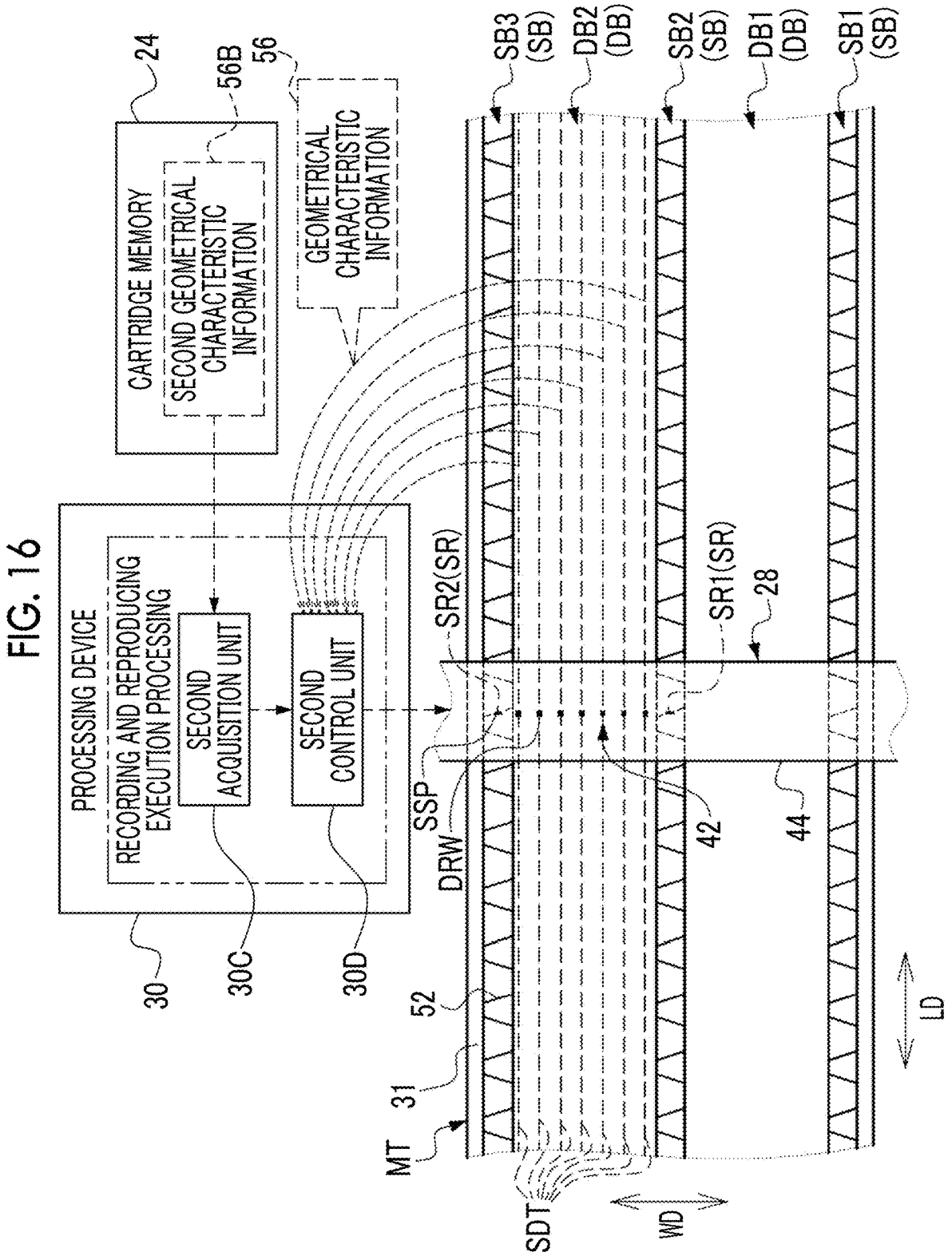
Figure 17:
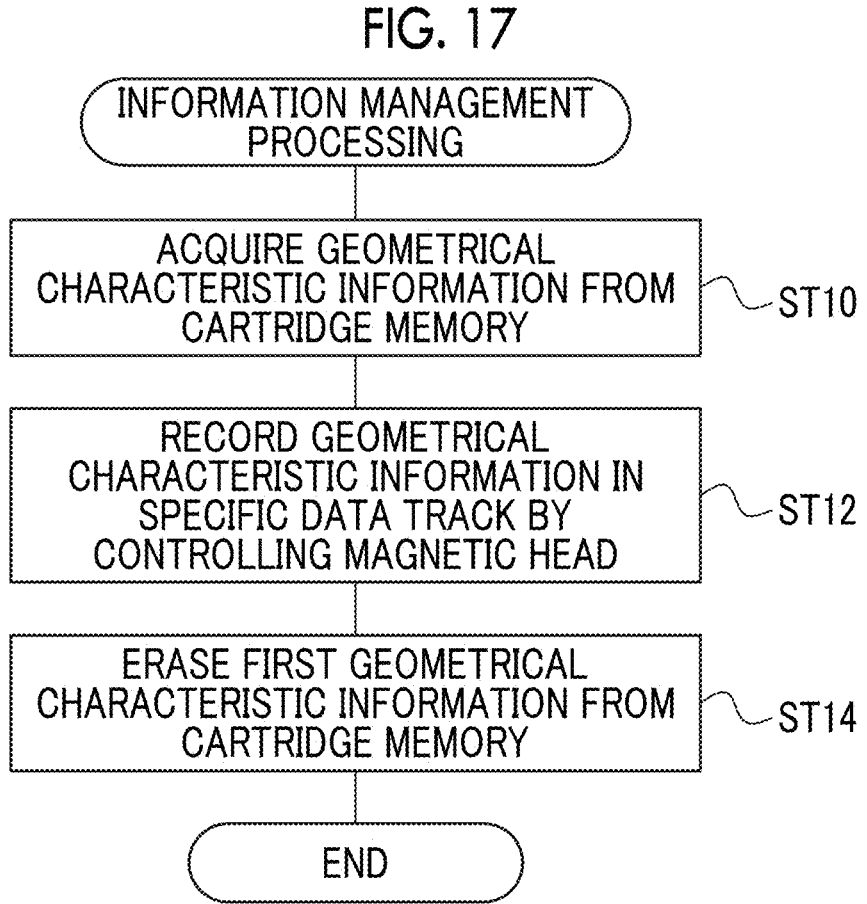
Figure 19:
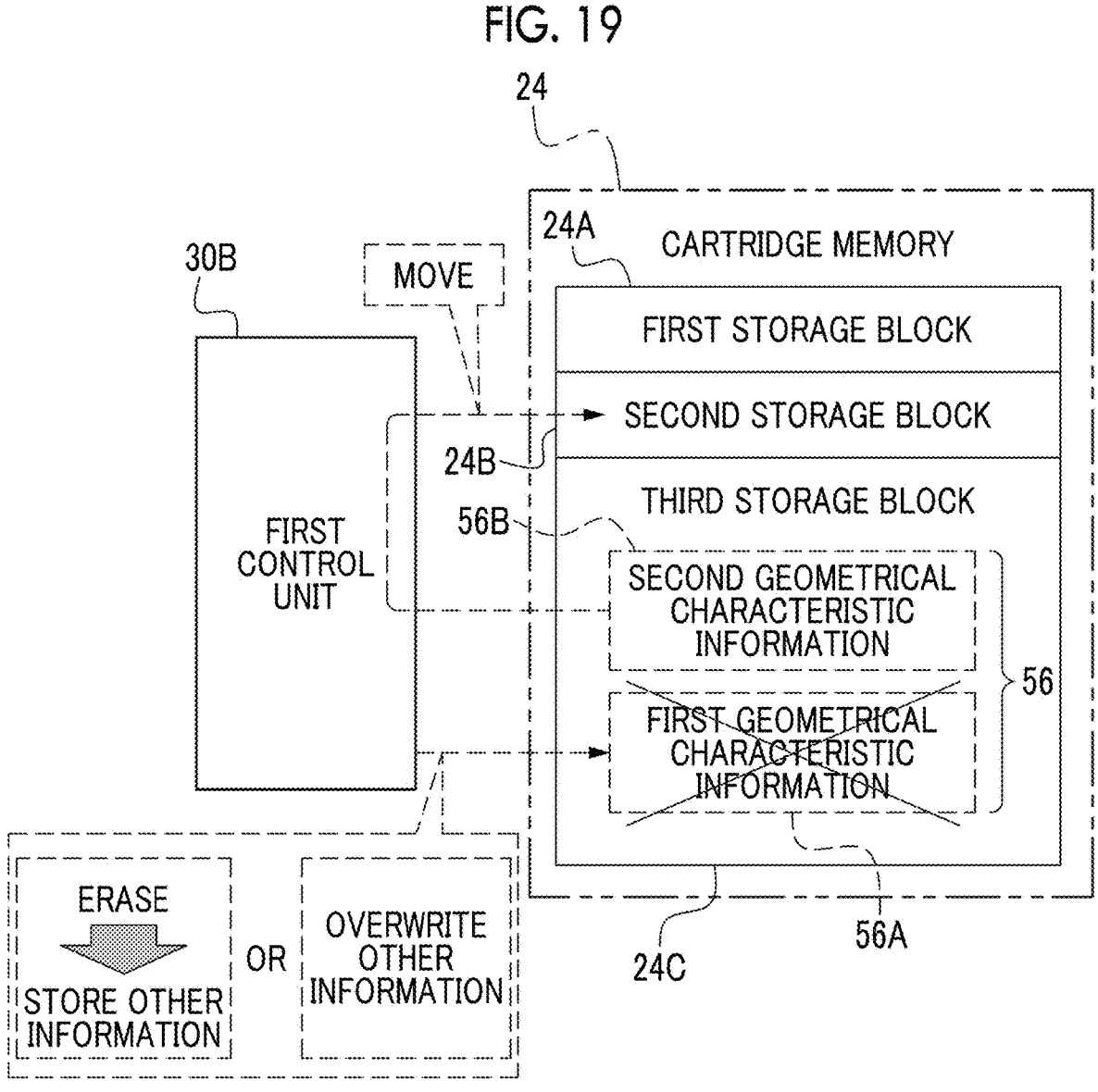
Figure 20:
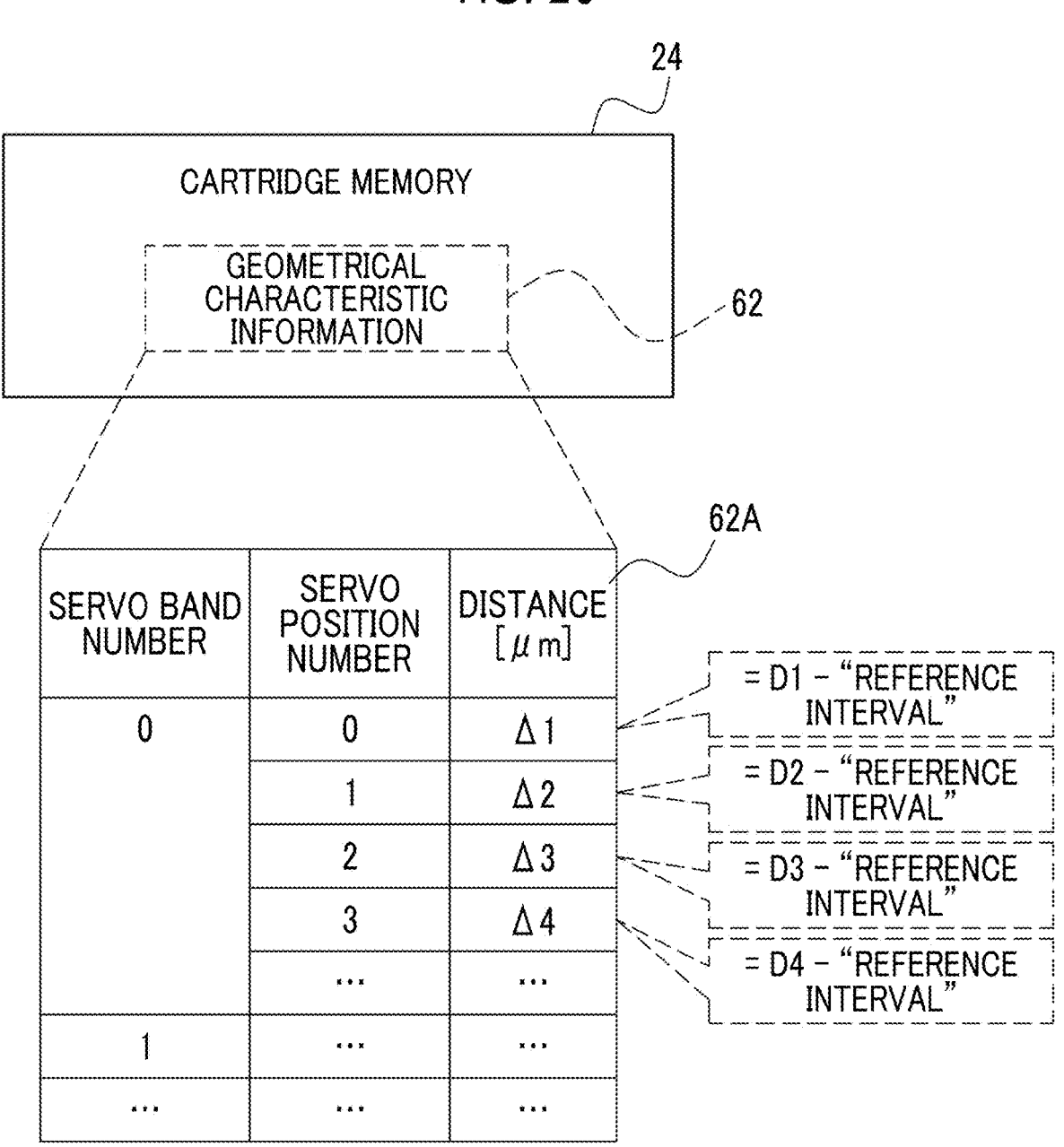
Figure 21:
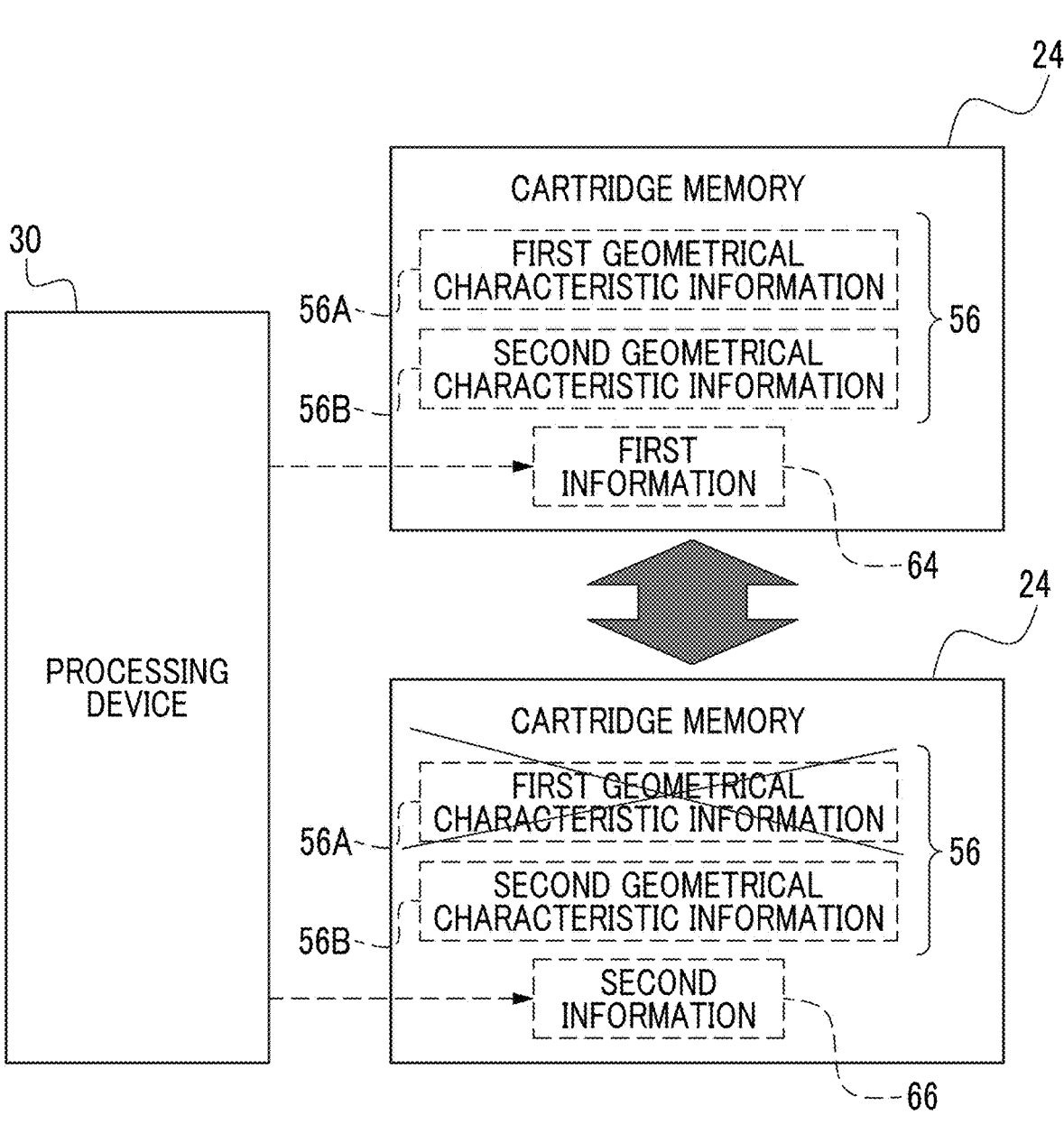

FIG. 11 is a conceptual diagram showing an example of a manufacturing process of a magnetic tape;

FIG. 12 is a conceptual diagram showing an example of a difference between an ideal servo pattern and an actual servo pattern;

FIG. 13 is a conceptual diagram showing an example of an aspect in which geometrical characteristic information is generated and stored in a cartridge memory;

FIG. 14 is a conceptual diagram showing an example of an aspect in which the geometrical characteristic information stored in the cartridge memory is recorded in the specific data track of the magnetic tape;

FIG. 15 is a conceptual diagram showing an example of an aspect in which the second geometrical characteristic information is left in the cartridge memory by erasing the first geometrical characteristic information from the cartridge memory;

FIG. 16 is a conceptual diagram showing an example of an aspect in which the geometrical characteristic information is read out from a division data track (that is, a specific data track) corresponding to a specific servo position specified by referring to the second geometrical characteristic information stored in the cartridge memory;

FIG. 17 is a flowchart showing an example of a flow of information management processing;

FIG. 18 is a flowchart showing an example of a flow of recording and reproducing execution processing;

FIG. 19 is a conceptual diagram showing an example of an aspect in which second geometrical characteristic information is moved from a third storage block to a second storage block in the cartridge memory and first geometrical characteristic information is erased from the third storage block;

FIG. 20 is a conceptual diagram showing an example of a modification example of the geometrical characteristic information; and FIG. 21 is a conceptual diagram showing an example of an aspect in which first information and second information are selectively stored in the cartridge memory.

DETAILED DESCRIPTION

Hereinafter, an example of an embodiment of a magnetic tape drive, a magnetic tape cartridge, and an information management method according to the technology of the present disclosure will be described with reference to the accompanying drawings.

First, the terms used in the following description will be described.

CPU is an abbreviation for "central processing unit". RAM is an abbreviation stands for "random access memory". NVM refers to the abbreviation for "non-volatile memory". EEPROM indicates the abbreviation for "electrically erasable and programmable read only memory". SSD is an abbreviation for "solid state drive". HDD refers to the abbreviation for "hard disk drive". USB refers to the abbreviation for "universal serial bus". ASIC is an abbreviation stands for "application specific integrated circuit". PLD is an abbreviation for "programmable logic device". FPGA is an abbreviation stands for "field-programmable gate array". SoC is an abbreviation for "system-on-a-chip". I/F is an abbreviation of "interface". UI is an abbreviation for "user interface". IC is an abbreviation for "integrated circuit". RFID is an abbreviation for "radio frequency identifier". MFM is an abbreviation for "magnetic force microscope". SEM is an abbreviation for "scanning electron microscope".

Figure 1:
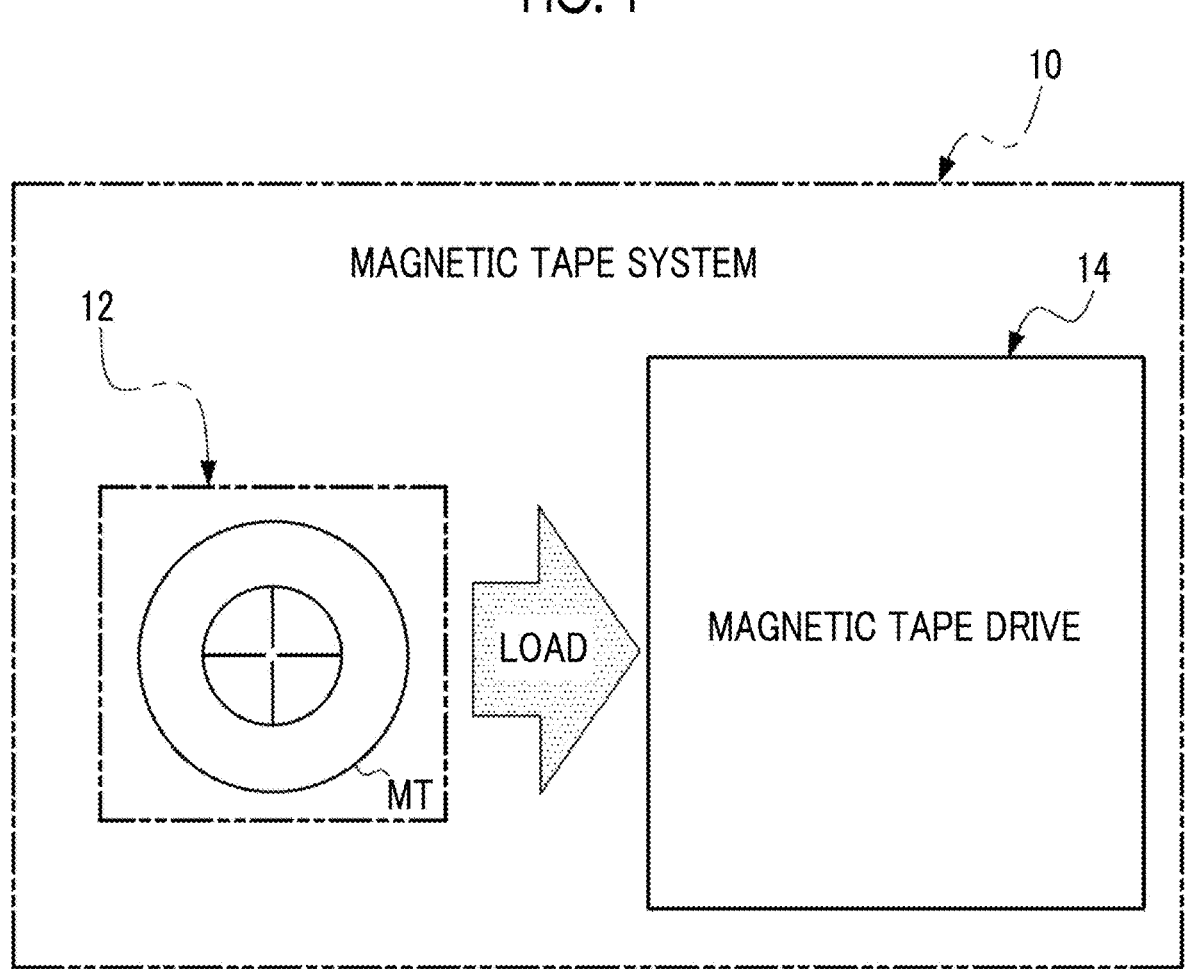
FIG. 1 is a conceptual diagram showing an example of a configuration of a magnetic tape system.

As shown in FIG. 1 as an example, a magnetic tape system 10 comprises a magnetic tape cartridge 12 and a magnetic tape drive 14. The magnetic tape drive 14 is loaded with the magnetic tape cartridge 12. The magnetic tape cartridge 12 accommodates a magnetic tape MT. The magnetic tape drive 14 extracts the magnetic tape MT from the loaded magnetic tape cartridge 12, and records data onto the magnetic tape MT or reads data from the magnetic tape MT while the extracted magnetic tape MT is traveling.

In the present embodiment, the magnetic tape MT is an example of a "magnetic tape" according to the technology of the present disclosure. In addition, in the present embodiment, the magnetic tape drive 14 is an example of a "magnetic tape drive" according to the technology of the present disclosure. In addition, in the present embodiment, the magnetic tape cartridge 12 is an example of a "magnetic tape cartridge" according to the technology of the present disclosure.

Next, an example of a configuration of the magnetic tape cartridge 12 will be described with reference to FIGS. 2 to 4. In the following description, for convenience of description, in FIGS. 2 to 4, a direction of loading the magnetic tape cartridge 12 into the magnetic tape drive 14 is indicated by an arrow A, a direction of the arrow A is defined as a front direction of the magnetic tape cartridge 12, and a side of the magnetic tape cartridge 12 in the front direction is defined as a front side of the magnetic tape cartridge 12. In the description of the structure to be shown below, "front" indicates the front side of the magnetic tape cartridge 12.

In addition, in the following description, for convenience of description, in FIGS. 2 to 4, a direction of an arrow B that is perpendicular to the direction of the arrow A is defined as a right direction, and a side of the magnetic tape cartridge 12 in the right direction is defined as a right side of the magnetic tape cartridge 12. In the description of the structure to be shown below, "right" indicates the right side of the magnetic tape cartridge 12.

In addition, in the following description, for convenience of description, in FIGS. 2 to 4, a direction opposite to the direction of the arrow B is defined as a left direction, and a side of the magnetic tape cartridge 12 in the left direction is defined as a left side of the magnetic tape cartridge 12. In the description of the structure to be shown below, "left" indicates the left side of the magnetic tape cartridge 12.

In addition, in the following description, for convenience of description, in FIGS. 2 to 4, a direction perpendicular to the direction of the arrow A and to the direction of the arrow B is indicated by an arrow C, a direction of the arrow C is defined as an upper direction of the magnetic tape cartridge 12, and a side of the magnetic tape cartridge 12 in the upper direction is defined as an upper side of the magnetic tape cartridge 12. In the description of the structure to be shown below, "upper" indicates the upper side of the magnetic tape cartridge 12.

In addition, in the following description, for convenience of description, in FIGS. 2 to 4, a direction opposite to the front direction of the magnetic tape cartridge 12 is defined as a rear direction of the magnetic tape cartridge 12, and a side of the magnetic tape cartridge 12 in the rear direction is defined as a rear side of the magnetic tape cartridge 12. In the description of the structure to be shown below, "rear" indicates the rear side of the magnetic tape cartridge 12.

In addition, in the following description, for convenience of description, in FIGS. 2 to 4, a direction opposite to the upper direction of the magnetic tape cartridge 12 is defined as a lower direction of the magnetic tape cartridge 12, and a side of the magnetic tape cartridge 12 in the lower direction is defined as a lower side of the magnetic tape cartridge 12. In the description of the structure to be shown below, "lower" indicates the lower side of the magnetic tape cartridge 12.

Figure 2:
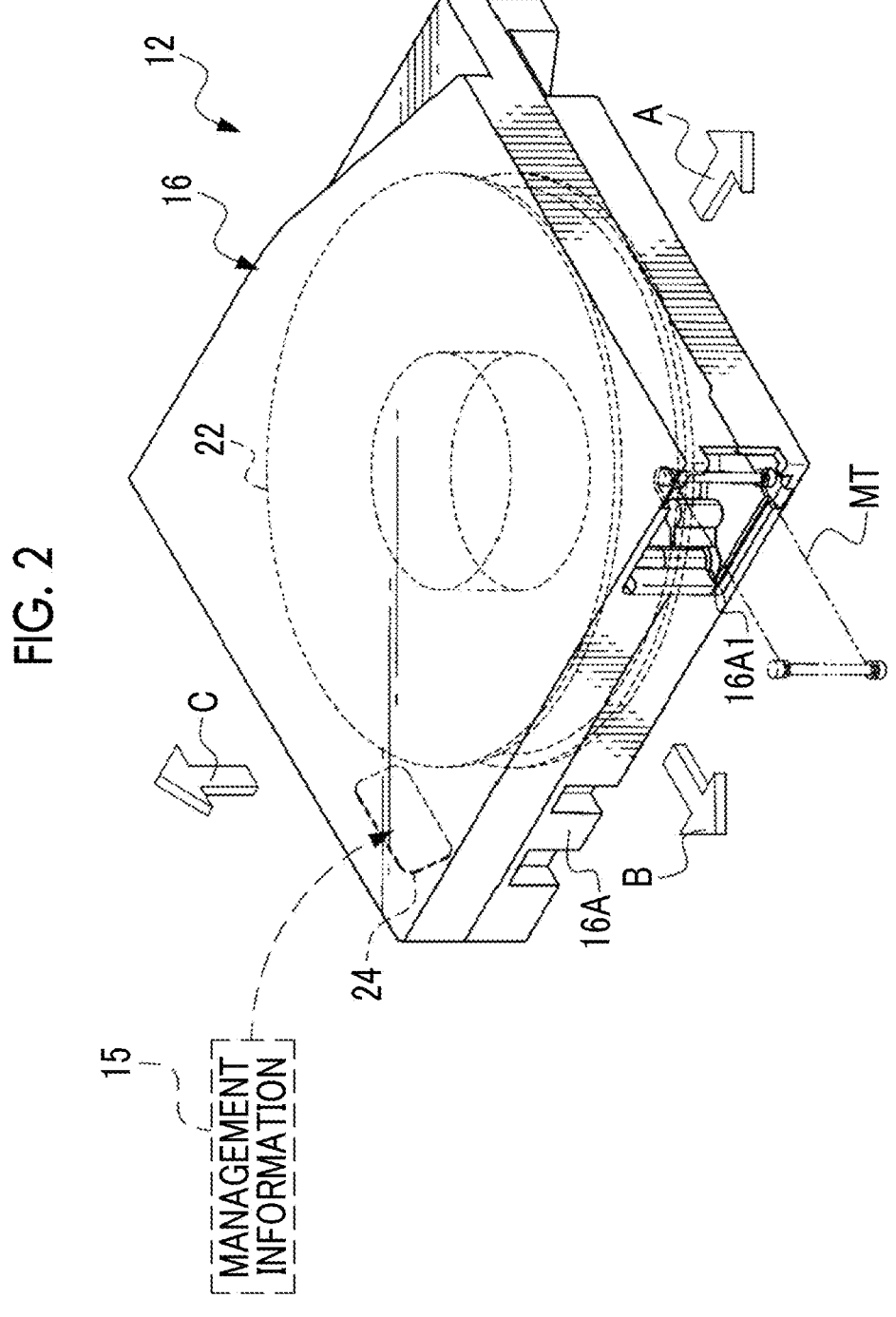
FIG. 2 is a schematic perspective view showing an example of an appearance of a magnetic tape cartridge.

As shown in FIG. 2 as an example, the magnetic tape cartridge 12 has a substantially rectangular shape in a plan view and comprises a box-like case 16. The magnetic tape MT is accommodated in the case 16.

A sending reel 22 is rotatably accommodated inside the case 16. The magnetic tape MT is wound around the sending reel 22. An opening 16A1 is formed on the front side of a right wall 16A of the case 16. The magnetic tape MT is extracted from the opening 16A1.

In the case 16, a cartridge memory 24 is accommodated as a storage medium other than the magnetic tape MT. An IC chip having an NVM is mounted in the cartridge memory 24. In the present embodiment, a so-called passive type RFID tag is employed as the cartridge memory 24, and reading and writing of various kinds of information (that is, storage and acquisition of the various kinds of information) are performed with respect to the cartridge memory 24 in a non-contact manner.

In the cartridge memory 24, management information 15 for managing the magnetic tape cartridge 12 is stored. The management information 15 includes, for example, information on the cartridge memory 24, information on the magnetic tape MT, information on the magnetic tape drive 14, and the like. The cartridge memory 24 is an example of a "storage medium" according to the technology of the present disclosure.

Figure 3:
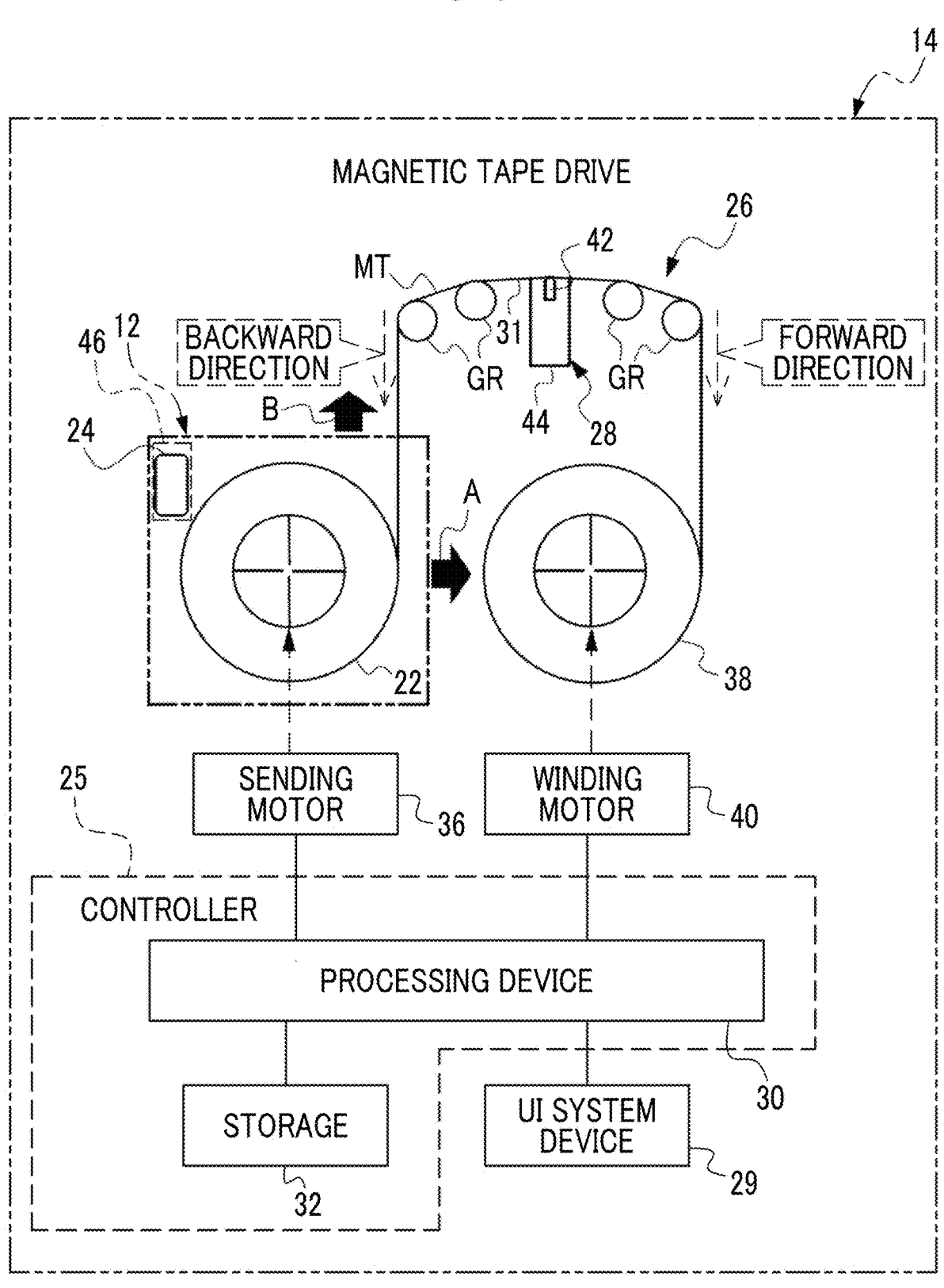
FIG. 3 is a schematic configuration diagram showing an example of a hardware configuration of a magnetic tape drive.

As shown in FIG. 3 as an example, the magnetic tape drive 14 comprises a controller 25, a transport device 26, a magnetic head 28, and a UI system device 29. The controller 25 comprises a processing device 30 and a storage 32. The processing device 30 is an example of a "processor" according to the technology of the present disclosure. The magnetic head 28 is an example of a "magnetic head" according to the technology of the present disclosure.

The magnetic tape cartridge 12 is loaded into the magnetic tape drive 14 along the direction of the arrow A. In the magnetic tape drive 14, the magnetic tape MT is extracted from the magnetic tape cartridge 12 and used. The magnetic tape drive 14 uses the management information 15 or the like stored in the cartridge memory 24 to control each unit provided in the magnetic tape cartridge 12 and the magnetic tape drive 14.

The magnetic tape drive 14 performs magnetic processing on a front surface 31 of the magnetic tape MT by using the magnetic head 28 in a state in which the magnetic tape MT is traveling. Here, the magnetic processing refers to recording processing of recording data on the front surface 31 of the magnetic tape MT and processing of reading data from the front surface 31 of the magnetic tape MT (that is, reproducing processing of reproducing data). In the present embodiment, the magnetic tape drive 14 selectively performs the recording of the data on the front surface 31 of the magnetic tape MT and the reading of the data from the front surface 31 of the magnetic tape MT by using the magnetic head 28. That is, the magnetic tape drive 14 extracts the magnetic tape MT from the magnetic tape cartridge 12, and records the data on the front surface 31 of the extracted magnetic tape MT by using the magnetic head 28 or reads the data from the front surface 31 of the extracted magnetic tape MT by using the magnetic head 28.

The processing device 30 controls entirety of the magnetic tape drive 14. In the present embodiment, although the processing device 30 is realized by an ASIC, the technology of the present disclosure is not limited thereto. For example, the processing device 30 may be realized by an FPGA and/or a PLD. In addition, the processing device 30 may be realized by a computer including a CPU, a flash memory (for example, an EEPROM, an SSD, and/or the like), and a RAM. In addition, the processing device 30 may be realized by combining two or more of an ASIC, an FPGA, a PLD, and a computer. That is, the processing device 30 may be realized by a combination of a hardware configuration and a software configuration.

The storage 32 is connected to the processing device 30, and the processing device 30 performs writing of various kinds of information to the storage 32 and reading of various kinds of information from the storage 32. An example of the storage 32 includes a flash memory and/or an HDD. The flash memory and the HDD are merely examples, and any memory may be used as long as the memory is a non-volatile memory that can be mounted in the magnetic tape drive 14.

The UI system device 29 is a device having an acceptance function of accepting an instruction signal indicating an instruction from a user, and a presentation function of presenting information to the user. The acceptance function is implemented by, for example, a touch panel, a hard key (for example, a keyboard), and/or a mouse. The presentation function is implemented by, for example, a display, a printer, and/or a speaker. The UI system device 29 is connected to the processing device 30. The processing device 30 acquires the instruction signal accepted by the UI system device 29. The UI system device 29 presents various kinds of information to the user, under the control of the processing device 30.

The transport device 26 is a device that selectively transports the magnetic tape MT along a predetermined path in a forward direction and a backward direction, and comprises a sending motor 36, a winding reel 38, a winding motor 40, and a plurality of guide rollers GR. Here, the forward direction indicates a feeding direction of the magnetic tape MT, and the backward direction indicates a rewinding direction of the magnetic tape MT.

The sending motor 36 rotates the sending reel 22 provided in the magnetic tape cartridge 12, under the control of the processing device 30. The processing device 30 controls the sending motor 36 to control a rotation direction, a rotation speed, a rotation torque, and the like of the sending reel 22.

The winding motor 40 rotates the winding reel 38, under the control of the processing device 30. The processing device 30 controls the winding motor 40 to control a rotation direction, a rotation speed, a rotation torque, and the like of the winding reel 38.

In a case in which the magnetic tape MT is to be wound onto the winding reel 38, the processing device 30 rotates the sending motor 36 and the winding motor 40 such that the magnetic tape MT travels along the predetermined path in the forward direction. The rotation speeds, the rotation torques, and the like of the sending motor 36 and the winding motor 40 are adjusted according to a speed at which the magnetic tape MT is wound onto the winding reel 38. In addition, by adjusting the rotation speed, the rotation torque, and the like of each of the sending motor 36 and the winding motor 40 through the processing device 30, tension is applied to the magnetic tape MT. Additionally, the tension applied to the magnetic tape MT is controlled by adjusting the rotation speed, the rotation torque, and the like of each of the sending motor 36 and the winding motor 40 through the processing device 30.

In a case in which the magnetic tape MT is to be rewound onto the sending reel 22, the processing device 30 rotates the sending motor 36 and the winding motor 40 such that the magnetic tape MT travels along the predetermined path in the backward direction.

Each of the plurality of guide rollers GR is a roller that guides the magnetic tape MT. The predetermined path, that is, a traveling path of the magnetic tape MT is determined by separately disposing the plurality of guide rollers GR at positions straddling the magnetic head 28 between the magnetic tape cartridge 12 and the winding reel 38.

The magnetic head 28 comprises a magnetic element unit 42 and a holder 44. The magnetic element unit 42 is held by the holder 44 so as to come into contact with the traveling magnetic tape MT. The magnetic element unit 42 includes a plurality of magnetic elements.

The magnetic element unit 42 records data on the magnetic tape MT transported by the transport device 26, and reads data from the magnetic tape MT transported by the transport device 26. Here, the data refers to, for example, a servo pattern 52 (see FIG. 6) and data other than the servo pattern 52, that is, data recorded in a data band DB (see FIG. 6).

The magnetic tape drive 14 comprises a noncontact read/write device 46. The noncontact read/write device 46 is disposed to confront a back surface of the cartridge memory 24 on the lower side of the magnetic tape cartridge 12 in a state in which the magnetic tape cartridge 12 is loaded, and performs reading and writing of information with respect to the cartridge memory 24 in a non-contact manner.

Figure 4:
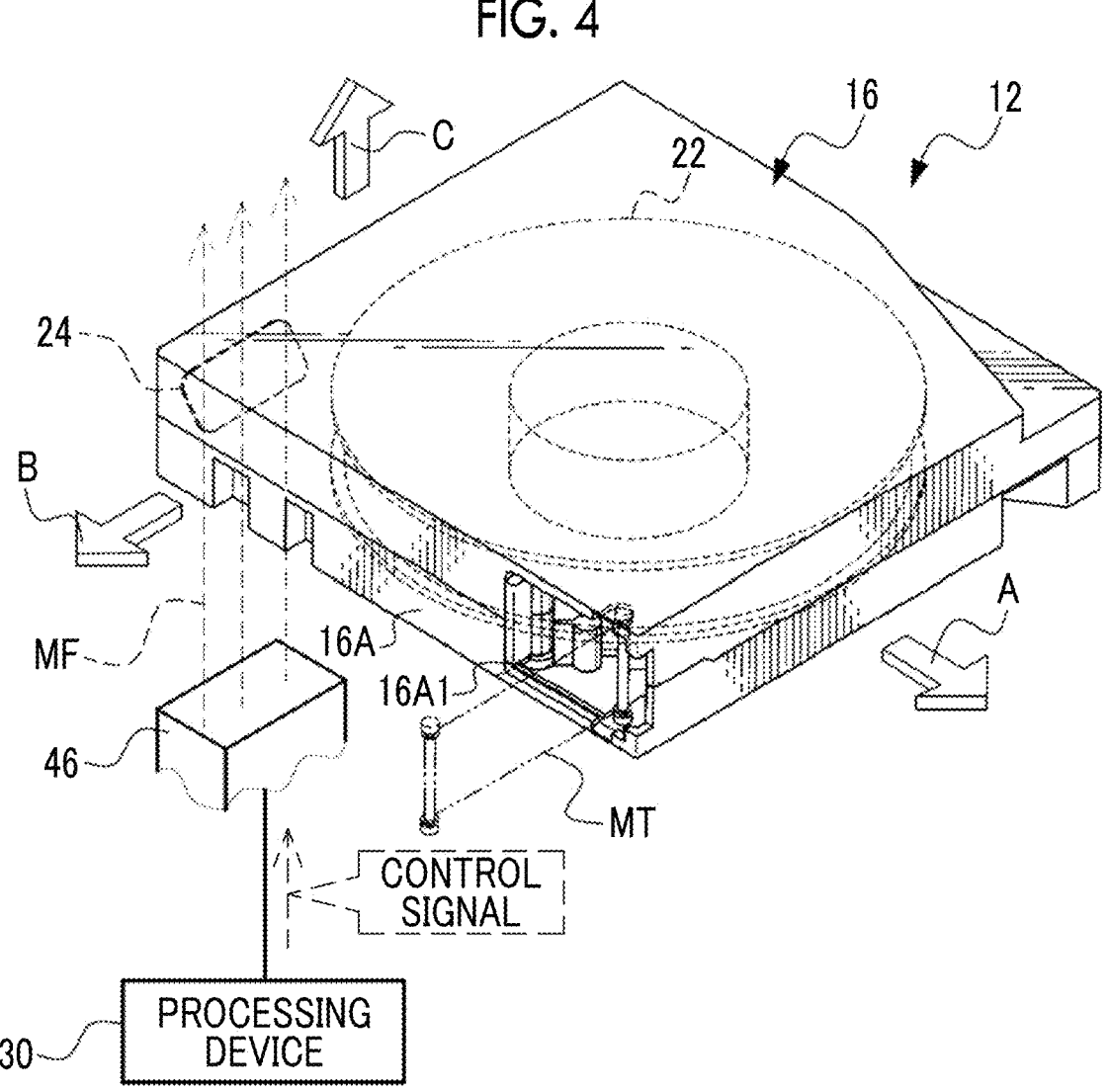
FIG. 4 is a schematic perspective view showing an example of an aspect in which a magnetic field is released by a noncontact read/write device from a lower side of the magnetic tape cartridge.

As shown in FIG. 4 as an example, the noncontact read/write device 46 releases a magnetic field MF from the lower side of the magnetic tape cartridge 12 toward the cartridge memory 24. The magnetic field MF passes through the cartridge memory 24.

The noncontact read/write device 46 is connected to the processing device 30. The processing device 30 outputs a control signal to the noncontact read/write device 46. The control signal is a signal for controlling the cartridge memory 24. The noncontact read/write device 46 generates the magnetic field MF in response to the control signal input from the processing device 30, and releases the generated magnetic field MF toward the cartridge memory 24.

The noncontact read/write device 46 performs processing on the cartridge memory 24 in response to the control signal by performing noncontact communication with the cartridge memory 24 via the magnetic field MF. For example, the noncontact read/write device 46 selectively performs, under the control of the processing device 30, processing of reading the information from the cartridge memory 24 and processing of storing the information in the cartridge memory 24 (that is, processing of writing the information to the cartridge memory 24). In other words, the processing device 30 reads the information from the cartridge memory 24 and stores the information in the cartridge memory 24 by performing communication with the cartridge memory 24 via the noncontact read/write device 46 in a non-contact manner.

Figure 5:
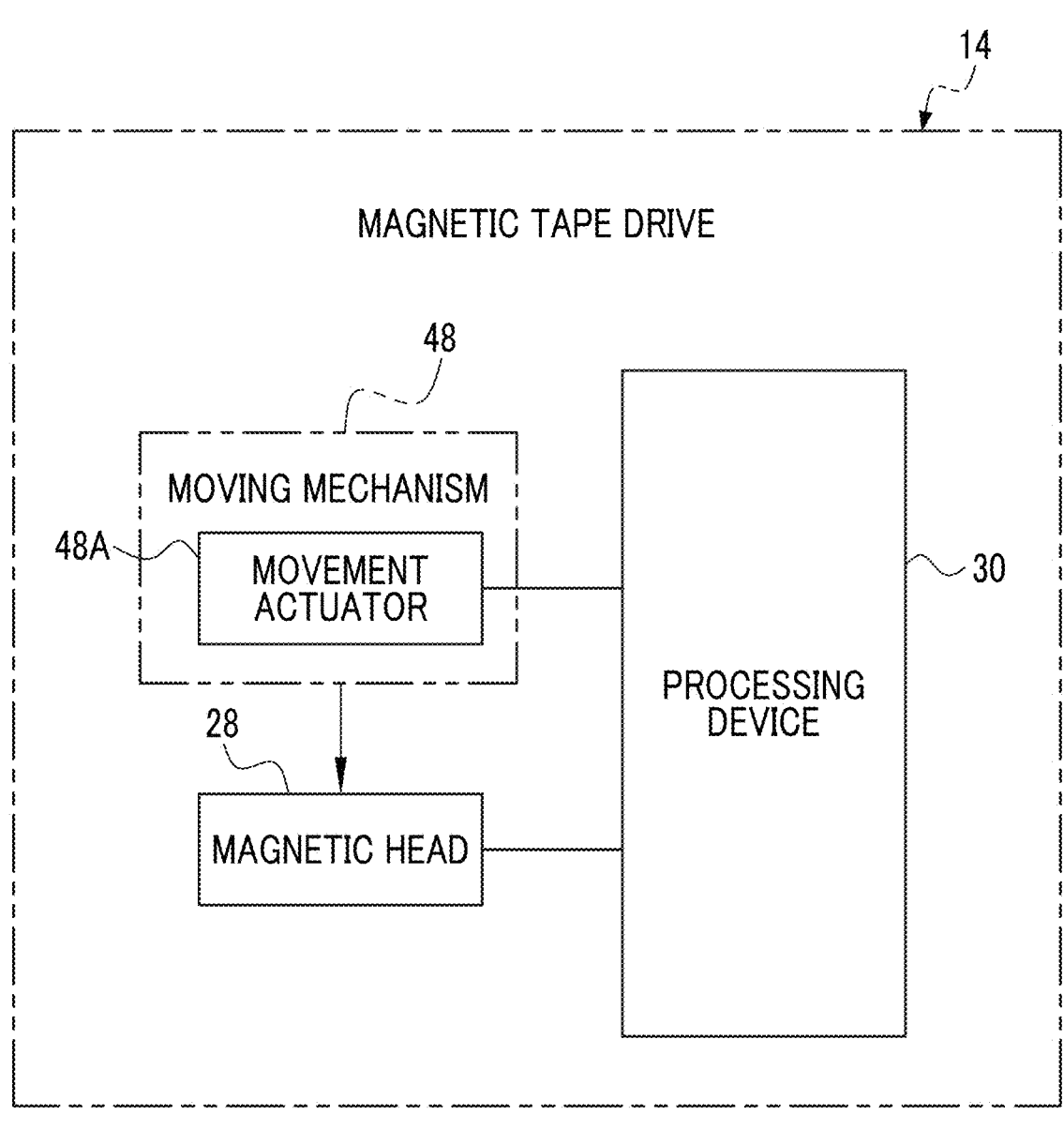
FIG. 5 is a conceptual diagram showing an example of a correlation between a processing device, a moving mechanism, and a magnetic head.

As shown in FIG. 5 as an example, the magnetic tape drive 14 comprises a moving mechanism 48. The moving mechanism 48 includes a movement actuator 48A. Examples of the movement actuator 48A include a voice coil motor and/or a piezo actuator. The movement actuator 48A is connected to the processing device 30, and the processing device 30 controls the movement actuator 48A. The movement actuator 48A generates power under the control of the processing device 30. The moving mechanism 48 moves the magnetic head 28 in a width direction WD (see FIG. 6) of the magnetic tape MT by receiving the power generated by the movement actuator 48A.

Figure 6:
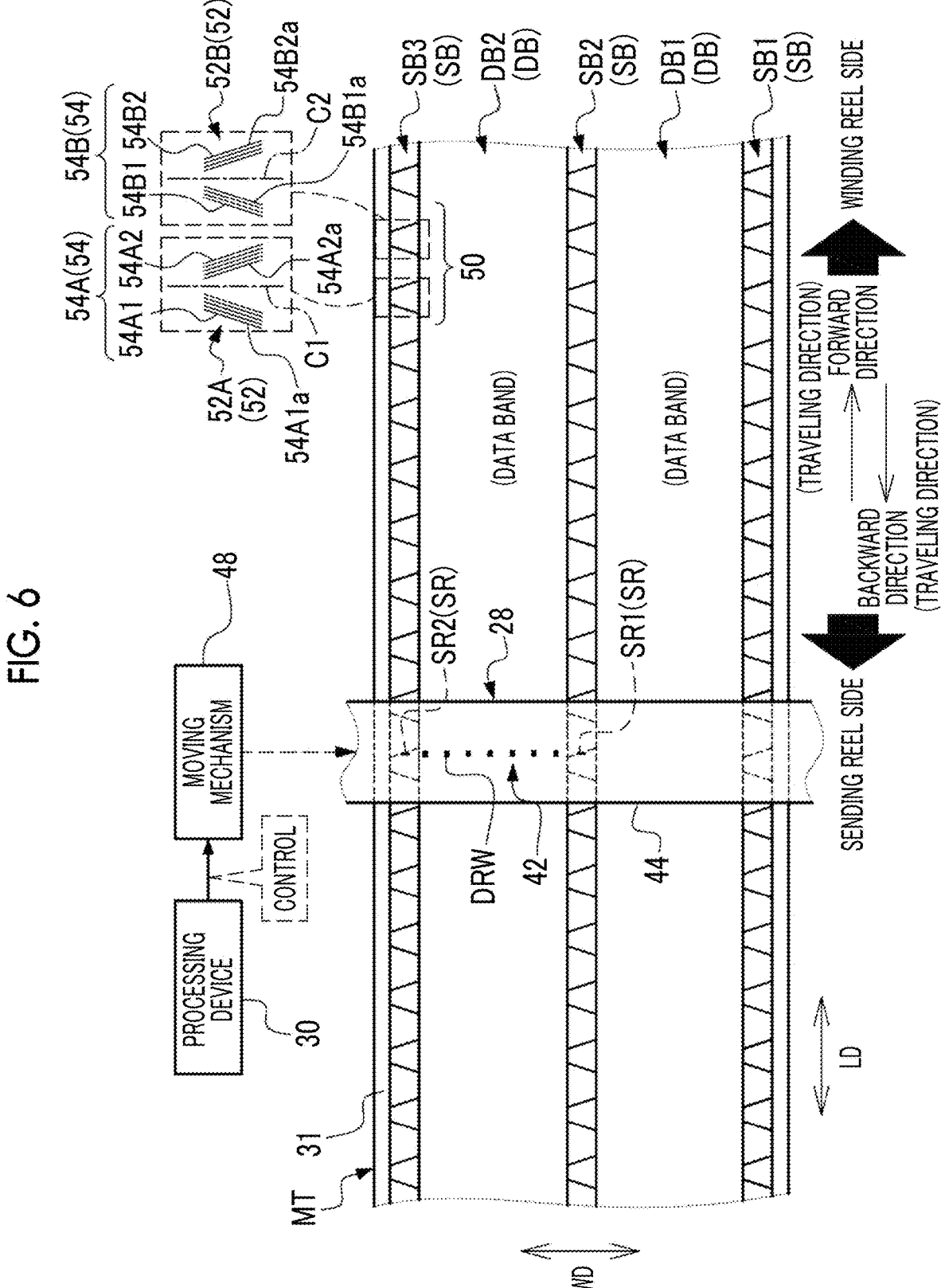
FIG. 6 is a conceptual diagram showing an example of an aspect in which a state in which the magnetic head is positioned on the magnetic tape is observed from the front surface side of the magnetic tape.

As shown in FIG. 6 as an example, on the front surface 31 of the magnetic tape MT, servo bands SB1, SB2, and SB3 and data bands DB1 and DB2 are formed. In the following, for convenience of description, in a case where the distinction is not specifically needed, the servo bands SB1 to SB3 are referred to as a "servo band SB" and the data bands DB1 and DB2 are referred to as a "data band DB".

The servo bands SB1 to SB3 and the data bands DB1 and DB2 are formed along the longitudinal direction LD (that is, an total length direction) of the magnetic tape MT. Here, the longitudinal direction LD refers to the traveling direction of the magnetic tape MT, in other words. The traveling direction of the magnetic tape MT is defined in two directions of the forward direction which is a direction in which the magnetic tape MT travels from the sending reel 22 side to the winding reel 38 side (hereinafter, also simply referred to as a "forward direction"), and the backward direction which is a direction in which the magnetic tape MT travels from the winding reel 38 side to the sending reel 22 side (hereinafter, also simply referred to as a "backward direction").

The servo bands SB1 to SB3 are arranged at positions spaced in the width direction WD of the magnetic tape MT (hereinafter, also simply referred to as a "width direction WD"). For example, the servo bands SB1 to SB3 are arranged at equal intervals along the width direction WD. In the present embodiment, the term "equal intervals" refers to equal intervals in the sense of including, in addition to a completely equal interval, an error that is generally acceptable in the technical field to which the technology of the present disclosure belongs, and that does not contradict the purpose of the technology of the present disclosure.

The data band DB1 is disposed between the servo band SB1 and the servo band SB2, and the data band DB2 is disposed between the servo band SB2 and the servo band SB3. That is, the servo bands SB and the data bands DB are arranged alternately along the width direction WD.

In the example shown in FIG. 6, for convenience of description, three servo bands SB and two data bands DB are shown, but these are merely examples, and two servo bands SB and one data band DB may be used, and the technology of the present disclosure is established even in a case where four or more servo bands SB and three or more data bands DB are used.

A plurality of servo patterns 52 are recorded in the servo band SB along the longitudinal direction LD. The servo patterns 52 are classified into a servo pattern 52A and a servo pattern 52B. The plurality of servo patterns 52 are disposed at regular intervals along the longitudinal direction LD. In the present embodiment, the term "regular" refers to the regularity in the sense of including, in addition to the exact regularity, an error that is generally acceptable in the technical field to which the technology of the present disclosure belongs, and that does not contradict the purpose of the technology of the present disclosure.

The servo band SB is divided by a plurality of frames 50 along the longitudinal direction LD. The frame 50 is defined by a set of servo patterns 52. In the example shown in FIG. 6, the servo patterns 52A and 52B are shown as an example of the set of servo patterns 52. The servo patterns 52A and 52B are adjacent to each other along the longitudinal direction LD, and the servo pattern 52A is positioned on the upstream side in the forward direction, and the servo pattern 52B is positioned on the downstream side in the forward direction in the frame 50.

The servo pattern 52 consists of linear magnetization region pairs 54. The linear magnetization region pair 54 is classified into a linear magnetization region pair 54A and a linear magnetization region pair 54B.

The servo pattern 52A consists of the linear magnetization region pair 54A. In the example shown in FIG. 6, a pair of linear magnetization regions 54A1 and 54A2 is shown as an example of the linear magnetization region pair 54A. Each of the linear magnetization regions 54A1 and 54A2 is a linearly magnetized region.

The linear magnetization regions 54A1 and 54A2 are inclined in opposite directions with respect to an imaginary straight line C1 which is an imaginary straight line along the width direction WD. In the example shown in FIG. 6, the linear magnetization regions 54A1 and 54A2 are inclined line-symmetrically with respect to the imaginary straight line C1. More specifically, the linear magnetization regions 54A1 and 54A2 are formed in a state of being not parallel to each other and being inclined at a predetermined angle (for example, 5 degrees) in opposite directions on the longitudinal direction LD side with the imaginary straight line C1 as a symmetry axis.

The linear magnetization region 54A1 is a set of magnetization straight lines 54A1*a*, which are five magnetized straight lines. The linear magnetization region 54A2 is a set of magnetization straight lines 54A2*a*, which are five magnetized straight lines.

In the present embodiment, the imaginary straight line C1 is an example of an "imaginary straight line" according to the technology of the present disclosure. In addition, the linear magnetization region 54A1 is an example of a "first linear magnetization region" according to the technology of the present disclosure. In addition, the linear magnetization region 54A2 is an example of a "second linear magnetization region" according to the technology of the present disclosure.

The servo pattern 52B consists of the linear magnetization region pair 54B. In the example shown in FIG. 6, a pair of linear magnetization regions 54B1 and 54B2 is shown as an example of the linear magnetization region pair 54B. Each of the linear magnetization regions 54B 1 and 54B2 is a linearly magnetized region.

The linear magnetization regions 54B1 and 54B2 are inclined in opposite directions with respect to an imaginary straight line C2 which is an imaginary straight line along the width direction WD. In the example shown in FIG. 6, the linear magnetization regions 54B1 and 54B2 are inclined line-symmetrically with respect to the imaginary straight line C2. More specifically, the linear magnetization regions 54B1 and 54B2 are formed in a state of being not parallel to each other and being inclined at a predetermined angle (for example, 5 degrees) in opposite directions on the longitudinal direction LD side with the imaginary straight line C2 as a symmetry axis.

The linear magnetization region 54B1 is a set of magnetization straight lines 54B1*a*, which are four magnetized straight lines. The linear magnetization region 54B2 is a set of magnetization straight lines 54B2*a*, which are four magnetized straight lines.

In the present embodiment, the imaginary straight line C2 is an example of an "imaginary straight line" according to the technology of the present disclosure. In addition, the linear magnetization region 54B1 is an example of a "first linear magnetization region" according to the technology of the present disclosure. In addition, the linear magnetization region 54B2 is an example of a "second linear magnetization region" according to the technology of the present disclosure.

The magnetic head 28 is disposed on the front surface 31 side of the magnetic tape MT configured as described above. The holder 44 is formed in a rectangular parallelepiped shape, and is disposed to cross the front surface 31 of the magnetic tape MT along the width direction WD. The plurality of magnetic elements of the magnetic element unit 42 are arranged linearly along the longitudinal direction of the holder 44. The magnetic element unit 42 includes a pair of servo reading elements SR and a plurality of data read/write elements DRW as the plurality of magnetic elements.

A length of the holder 44 in the longitudinal direction is sufficiently long with respect to the width of the magnetic tape MT. For example, the length of the holder 44 in the longitudinal direction is set to a length exceeding the width of the magnetic tape MT even in a case where the magnetic element unit 42 is disposed at any position on the magnetic tape MT.

The pair of servo reading elements SR is mounted on the magnetic head 28. In the magnetic head 28, a relative positional relationship between the holder 44 and the pair of servo reading elements SR is fixed. The pair of servo reading elements SR consists of servo reading elements SR1 and SR2. The servo reading element SR1 is disposed at one end of the magnetic element unit 42, and the servo reading element SR2 is disposed at the other end of the magnetic element unit 42. In the example shown in FIG. 6, the servo reading element SR1 is provided at a position corresponding to the servo band SB2, and the servo reading element SR2 is provided at a position corresponding to the servo band SB3.

The plurality of data read/write elements DRW are disposed linearly between the servo reading element SR1 and the servo reading element SR2. The plurality of data read/write elements DRW are disposed at intervals along the longitudinal direction of the magnetic head 28 (for example, are disposed at equal intervals along the longitudinal direction of the magnetic head 28). In the example shown in FIG. 6, the plurality of data read/write elements DRW are provided at positions corresponding to the data band DB2.

The processing device 30 acquires a servo pattern signal which is a result of reading the servo pattern 52 by the servo reading element SR, and performs a servo control in response to the acquired servo pattern signal. Here, the servo control refers to a control of moving the magnetic head 28 in the width direction WD of the magnetic tape MT by operating the moving mechanism 48 in accordance with the servo pattern 52 read by the servo reading element SR.

By performing the servo control, the plurality of data read/write elements DRW are positioned on a designated region in the data band DB, and perform the magnetic processing on the designated region in the data band DB in this state. In the example shown in FIG. 6, the plurality of data read/write elements DRW perform the magnetic processing on the designated region in the data band DB2.

In addition, in a case in which the data band DB of which the data is to be read by the magnetic element unit 42 is changed (in the example shown in FIG. 6, the data band DB of which the data is to be read by the magnetic element unit 42 is changed from the data band DB2 to the data band DB1), the moving mechanism 48 moves, under the control of the processing device 30, the magnetic head 28 in the width direction WD to change the position of the pair of servo reading elements SR. That is, by moving the magnetic head 28 in the width direction WD, the moving mechanism

48 moves the servo reading element SR1 to a position corresponding to the servo band SB1 and moves the servo reading element SR2 to the position corresponding to the servo band SB2. As a result, the positions of the plurality of data read/write elements DRW are changed from on the data band DB2 to on the data band DB1, and the plurality of data read/write elements DRW perform the magnetic processing on the data band DB1.

Figure 7:
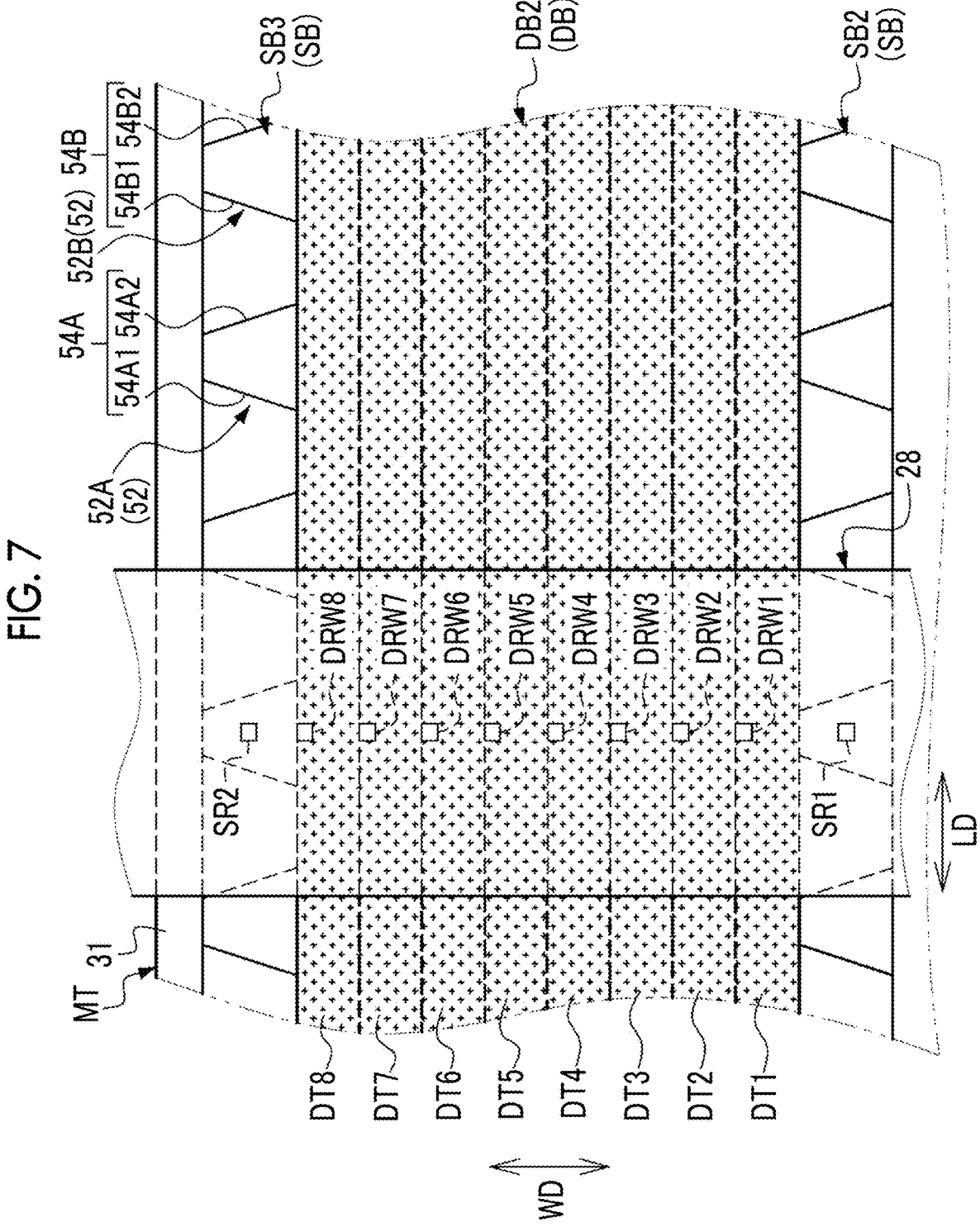
FIG. 7 is a conceptual diagram showing an example of a configuration of a data band formed on a front surface of the magnetic tape.

As shown in FIG. 7 as an example, in the data band DB2, as a plurality of division areas obtained by dividing the data band DB2 in the width direction WD, data tracks DT1, DT2, DT3, DT4, DT5, DT6, DT7, and DT8 are formed from the servo band SB2 side to the servo band SB3 side.

The magnetic head 28 includes, as the plurality of data read/write elements DRW, data read/write elements DRW1, DRW2, DRW3, DRW4, DRW5, DRW6, DRW7, and DRW8 between the servo reading element SR1 and the servo reading element SR2 along the width direction WD. The data read/write elements DRW1 to DRW8 have a one-to-one correspondence with the data tracks DT1 to DT8, and can read (that is, reproduce) data from the data tracks DT1 to DT8 and record (that is, write) the data on the data tracks DT1 to DT8.

In addition, although not shown, a plurality of data tracks DT corresponding to the data tracks DT1, DT2, DT3, DT4, DT5, DT6, DT7, and DT8 are also formed in the data band DB1 (s FIG. 6).

Hereinafter, in a case where the distinction is not specifically needed, the data tracks DT1, DT2, DT3, DT4, DT5, DT6, DT7, and DT8 are referred to as a "data track DT". In addition, in the following, in a case where the distinction is not specifically needed, the data read/write elements DRW1, DRW2, DRW3, DRW4, DRW5, DRW6, DRW7, and DRW8 are referred to as a "data read/write element DRW".

Figure 8:
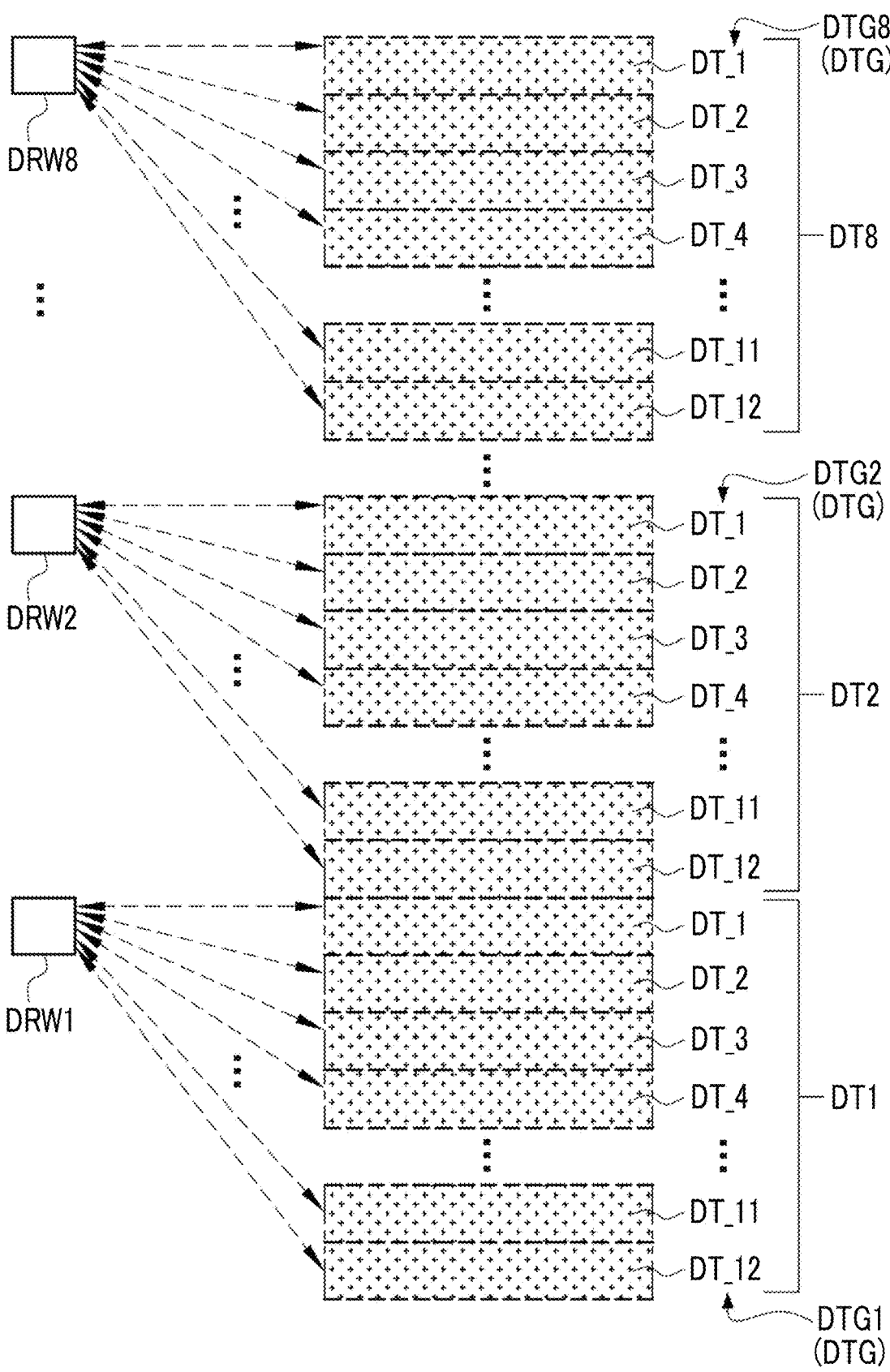
FIG. 8 is a conceptual diagram showing an example of a correspondence relationship between a data read/write element and a data track.

As shown in FIG. 8 as an example, the data track DT includes a division data track group DTG. The data tracks DT1 to DT8 correspond to division data track groups DTG1 to DTG8. In the following, in a case where a particular distinction is not necessary for description, the division data track groups DTG1 to DTG8 are referred to as a "division data track group DTG".

The division data track group DTG1 is a set of a plurality of division data tracks obtained by dividing the data track DT in the width direction WD. In the example shown in FIG. 8, as an example of the division data track group DTG1, the division data tracks DT_1, DT_2, DT_3, DT_4, ... , DT_11, and DT_12 obtained by dividing the data track DT into 12 equal parts in the width direction WD are shown. The data read/write element DRW1 is responsible for the magnetic processing on the division data track group DTG1. That is, the data read/write element DRW1 is responsible for recording data in the division data tracks DT_1, DT_2, DT_3, DT_4, ... , DT_11, and DT_12 and reading data from the division data tracks DT_1, DT_2, DT_3, DT_4, ... , DT_11, and DT_12. In the following, in a case where it is not necessary to distinguish between the division data tracks DT_1, DT_2, DT_3, DT_4, ... , DT_11, and DT_12, the division data tracks are referred to as "division data tracks" without reference numerals.

Each of the data read/write elements DRW2 to DRW8 is also responsible for the magnetic processing on the division data track group DTG of the data track DT corresponding to each data read/write element DRW, similarly to the data read/write element DRW1.

The data read/write element DRW is moved to a position corresponding to designated one data track DT among the plurality of data tracks DT with the movement of the magnetic head 28 in the width direction WD via the moving mechanism 48 (see FIG. 6). The data read/write element DRW is fixed at a position corresponding to one designated data track DT by a servo control using the servo pattern 52 (see FIGS. 6 and 7).

Figure 9:
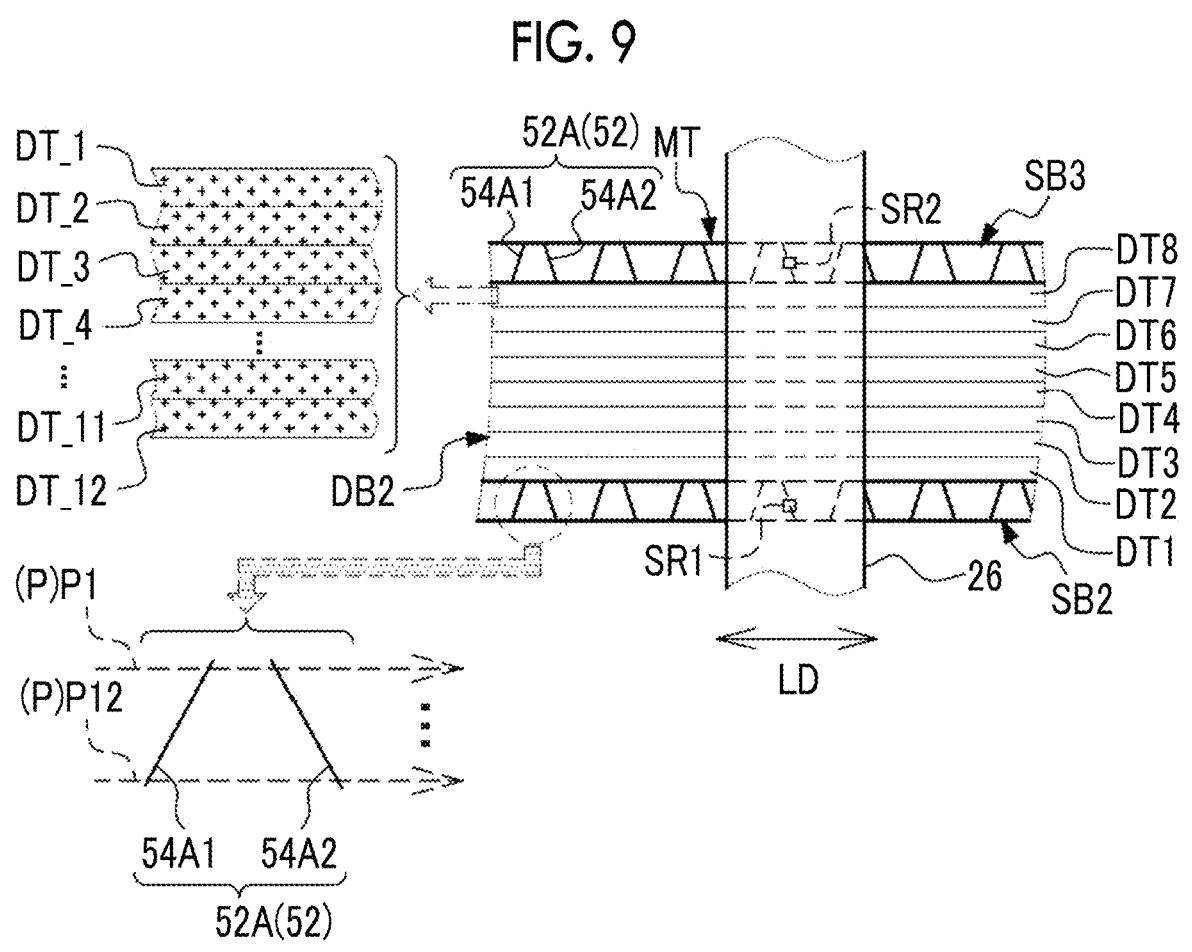

As shown in FIG. 9 as an example, in the servo pattern 52, paths P1 to P12 are assigned at equal intervals along the width direction WD. The paths P1 to P12 correspond to the plurality of division data tracks (12 division data tracks in the examples shown in FIGS. 9 and 10) included in the division data track group DTG. In the following description, in a case where it is not necessary to distinguish between the paths P1 to P12, the paths P1 to P12 are referred to as a "path P".

In a case where the data read/write element DRW performs the magnetic processing on the processing target division data track which is the division data track designated as a target of the magnetic processing, the moving mechanism 48 moves the magnetic head 28 in the width direction WD such that the servo reading element SR passes on the path P corresponding to the processing target division data track. For example, in a case in which the data read/write element DRW performs the magnetic processing on the division data track DT_1, the moving mechanism 48 moves the magnetic head 28 in the width direction WD such that the servo reading element SR passes through the path P1. In addition, for example, in a case in which the data read/write element DRW performs the magnetic processing on the division data track DT_12, the moving mechanism 48 moves the magnetic head 28 in the width direction WD such that the servo reading element SR passes through the path P12. As a result, the data read/write element DRW1 can face the processing target division data track and perform the magnetic processing on the processing target division data track.

Figure 10:
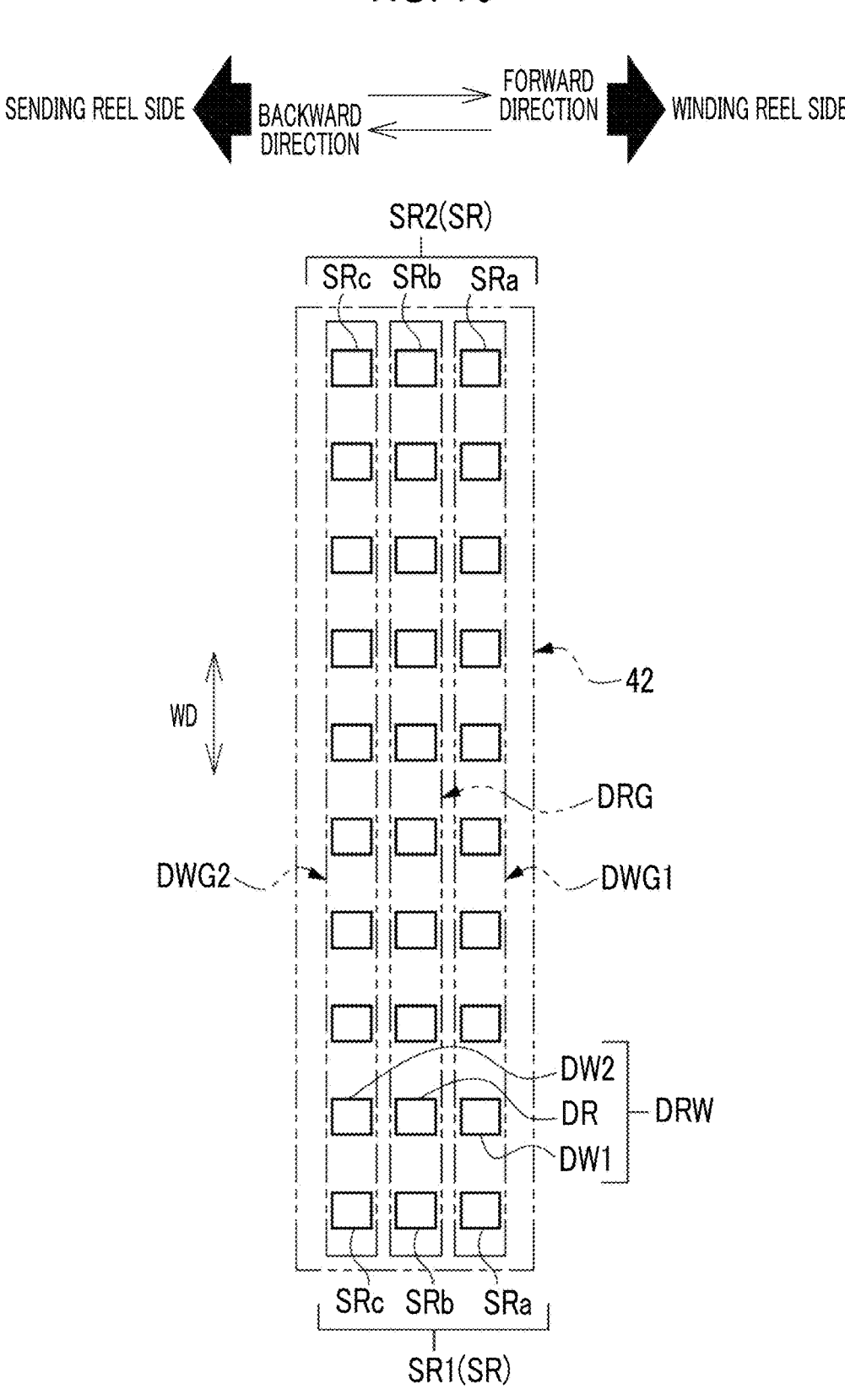
FIG. 10 is a conceptual diagram showing an example of a configuration of a magnetic element unit.

As shown in FIG. 10 as an example, the magnetic element unit 42 consists of a first data recording element group DWG1, a second data recording element group DWG2, and a data reading element group DRG. The servo reading element SR1 is located at one end of the magnetic element unit 42, and the servo reading element SR2 is located at the other end of the magnetic element unit 42.

The data read/write element DRW includes a first data recording element DW1, a second data recording element DW2, and a data reading element DR. The first data recording element group DWG1 includes a plurality of the first data recording elements DW1. The second data recording element group DWG2 includes a plurality of the second data recording elements DW2. The data reading element group DRG includes a plurality of the data reading elements DR.

The first data recording element DW1 and the second data recording element DW2 record data on the data track DT. The data reading element DR reads data from the data track DT. Hereinafter, in a case where a particular distinction is not necessary for description, the first data recording element DW1 and the second data recording element DW2 are referred to as a data recording element DW.

The first data recording element group DWG1, the second data recording element group DWG2, and the data reading element group DRG are arranged in the order of the first data recording element group DWG1, the data reading element group DRG, and the second data recording element group DWG2 at regular intervals from the winding reel 38 side to the sending reel 22 side along the longitudinal direction LD. Here, the constant interval indicates, for example, an interval predetermined by a test with a real machine and/or a computer simulation as an interval at which crosstalk does not occur between the data reading element DR and the data recording element DW.

The servo reading element SR has a first servo reading element SRa, a second servo reading element SRb, and a third servo reading element SRc. The first servo reading element SRa, the second servo reading element SRb, and the third servo reading element SRc are provided in the order of the first servo reading element SRa, the second servo reading element SRb, and the third servo reading element SRc from the winding reel 38 (see FIG. 3) side to the sending reel 22 (see FIG. 3) side in the total length direction of the magnetic tape MT.

Here, although the first servo reading element SRa, the second servo reading element SRb, and the third servo reading element SRc are illustrated, the technology of the present disclosure is not limited thereto, and one or two among the first servo reading element SRa, the second servo reading element SRb, and the third servo reading element SRc may be used.

The first data recording element group DWG1 has the first servo reading element SRa of the servo reading element SR1, the first servo reading element SRa of the servo reading element SR2, and the plurality of first data recording elements DW1. The plurality of first data recording elements DW1 are arranged linearly and at equal intervals from the first servo reading element SRa side of the servo reading element SR1 to the first servo reading element SRa side of the servo reading element SR2. The number of the plurality of first data recording elements DW1 included in the first data recording element group DWG1 is the same as the number of the data tracks DT included in the data band DB. In the example shown in FIG. 10, eight first data recording elements DW1 are exemplified as the plurality of first data recording elements DW1, and the positions of the first data recording elements DW1 correspond to the positions of the data read/write elements DRW1, DRW2, DRW3, DRW4, DRW5, DRW6, DRW7, and DRW8 (see FIGS. 7 and 8).

The second data recording element group DWG2 has the third servo reading element SRc of the servo reading element SR1, the third servo reading element SRc of the servo reading element SR2, and the plurality of second data recording elements DW2. The plurality of second data recording elements DW2 are arranged linearly and at equal intervals from the third servo reading element SRc side of the servo reading element SR1 to the third servo reading element SRc side of the servo reading element SR2. The number of the plurality of second data recording elements DW2 included in the second data recording element group DWG2 is the same as the number of the data tracks DT included in the data band DB. In the example shown in FIG. 10, eight second data recording elements DW2 are exemplified as the plurality of second data recording elements DW2, and the positions of the second data recording elements DW2 correspond to the positions of the data read/write elements DRW1, DRW2, DRW3, DRW4, DRW5, DRW6, DRW7, and DRW8 (see FIGS. 7 and 8).

The first data recording element DW1 and the second data recording element DW2 record (that is, write) data in the corresponding data tracks DT of all the data tracks DT included in the data band DB.

The data reading element group DRG has the second servo reading element SRb of the servo reading element SR1, the second servo reading element SRb of the servo reading element SR2, and the plurality of data reading elements DR. The plurality of data reading elements DR are arranged linearly and at equal intervals from the second servo reading element SRb side of the servo reading element SR1 to the second servo reading element SRb side of the servo reading element SR2. The number of the plurality of data reading elements DR included in the data reading element group DRG is the same as the number of the data tracks DT included in the data band DB. In the example shown in FIG. 10, eight data reading elements DR are exemplified as the plurality of data reading elements DR, and the positions of the data reading elements DR correspond to the positions of the data read/write elements DRW1, DRW2, DRW3, DRW4, DRW5, DRW6, DRW7, and DRW8 (see FIGS. 7 and 8).

The data reading element DR reads (that is, reproduces) data from the corresponding data track DT among all the data tracks DT included in the data band DB.

In the magnetic element unit 42, the data reading element DR has a structure in which the data reading element DR is interposed between the first data recording element DW1 and the second data recording element DW2 in the longitudinal direction LD in order not only to cause the data reading element DR to read data from the data track DT but also to realize the verification. For example, in a case where the magnetic tape MT is extracted from the magnetic tape cartridge 12 (in a case where the traveling direction of the magnetic tape MT is the forward direction), the second data recording element DW2 records data on the data track DT, and then, the data reading element DR reads, for error checking, the data recorded on the data track DT by the second data recording element DW2. Further, in a case where the magnetic tape MT is rewound onto the magnetic tape cartridge 12 (in a case where the traveling direction of the magnetic tape MT is the backward direction), the first data recording element DW1 records data on the data track DT, and then, the data reading element DR reads, for error checking, the data recorded on the data track DT by the first data recording element DW1.

As an example, as shown in FIG. 11, the manufacturing process of the magnetic tape MT includes a plurality of steps such as a servo pattern recording step and a winding step. In a servo pattern recording step, the servo writer SW is used. The servo writer SW comprises a sending reel SW1, a winding reel SW2, a driving device SW3, a pulse signal generator SW4, a control device SW5, a plurality of guides SW6, a transport passage SW7, a servo pattern magnetic head WH, and a verification head VH.

The control device SW5 controls the entire servo writer SW. In the present embodiment, although the control device SW5 is implemented by an ASIC, the technology of the present disclosure is not limited to this. For example, the control device SW5 may be implemented by an FPGA and/or a PLD. In addition, the control device SW5 may be implemented by the computer including a CPU, a flash memory (for example, an EEPROM and/or an SSD), and a RAM. In addition, the control device SW5 may be realized by combining two or more of an ASIC, an FPGA, a PLD, and a computer. That is, the control device SW5 may be implemented by a combination of a hardware configuration and a software configuration.

A pancake is set in the sending reel SW1. The pancake refers to a large-diameter roll in which the magnetic tape MT cut into a product width from a wide web raw material before writing the servo pattern 52 is wound around a hub.

The driving device SW3 has a motor (not shown) and a gear (not shown), and is mechanically connected to the sending reel SW1 and the winding reel SW2. In a case where the magnetic tape MT is wound by the winding reel SW2, the driving device SW3 generates power in accordance with instructions from the control device SW5, and transmits the generated power to the sending reel SW1 and the winding reel SW2 to rotate the sending reel SW1 and the winding reel SW2. That is, the sending reel SW1 receives the power from the driving device SW3 and rotates to feed the magnetic tape MT to the predetermined transport passage SW7. The winding reel SW2 receives the power from the driving device SW3 and rotates to wind the magnetic tape MT fed from the sending reel SW1. The rotation speed, the rotation torque, and the like of the sending reel SW1 and the winding reel SW2 are adjusted in accordance with a speed at which the magnetic tape MT is wound around the winding reel SW2.

The plurality of guides SW6 and the servo pattern magnetic head WH are disposed on the transport passage SW7. The servo pattern magnetic head WH is disposed on the front surface 31 side of the magnetic tape MT between the plurality of guides SW6. The magnetic tape MT fed from the sending reel SW1 to the transport passage SW7 is guided by the plurality of guides SW6 and is wound by the winding reel SW2 via the servo pattern magnetic head WH.

The pulse signal generator SW4 generates the pulse signal under the control of the control device SW5, and supplies the generated pulse signal to the servo pattern magnetic head WH. In a state in which the magnetic tape MT travels on the transport passage SW7 at a regular speed, the servo pattern magnetic head WH records the servo pattern 52 in the servo band SB in response to the pulse signal supplied from the pulse signal generator SW4.

The servo pattern recording step includes an inspection step. For example, the inspection step is a step of inspecting the servo band SB formed on the front surface 31 of the magnetic tape MT by the servo pattern magnetic head WH. The inspection of the servo band SB refers to, for example, processing of determining whether the servo pattern 52 recorded on the servo band SB is correct or not. The determination of the correctness of the servo pattern 52 refers to, for example, a determination (that is, verification of the servo pattern 52) whether or not the servo patterns 52A and 52B are recorded in a predetermined portion of the front surface 31 without excess or deficiency of the magnetization straight lines 54A1a, 54A2a, 54B1a, and 54B2a and within an allowable error.

The inspection step is performed by using the control device SW5 and the verification head VH. The verification head VH is disposed on the downstream side of the servo pattern magnetic head WH in a transport direction of the magnetic tape MT. In addition, similarly to the magnetic head 28, the verification head VH includes a plurality of servo reading elements (not shown), and the plurality of servo bands SB are read by the plurality of servo reading elements. Further, the verification head VH is skewed on the front surface 31 of the magnetic tape MT, similarly to the magnetic head 28.

The verification head VH is connected to the control device SW5. The verification head VH is disposed at a position facing the servo band SB as viewed from the front surface 31 side of the magnetic tape MT (that is, a rear surface side of the verification head VH), and reads the servo pattern 52 recorded on the servo band SB and outputs the reading result (hereinafter, referred to as "servo pattern reading result") to the control device SW5. The control device SW5 inspects the servo band SB (for example, determines whether the servo pattern 52 is correct or not) based on the servo pattern reading result (for example, the servo signal) input from the verification head VH.

In a case where the inspection step is ended, the winding step is then performed. The winding step is a step of winding the magnetic tape MT around the sending reel 22 (that is, the sending reel 22 accommodated in the magnetic tape cartridge 12) used for each of a plurality of the magnetic tape cartridges 12. In the winding step, a winding motor M is used. The winding motor M is mechanically connected to the sending reel 22 via a gear and the like. The winding motor M rotates the sending reel 22 by applying a rotational force to the sending reel 22 under the control of the control device (not shown). The magnetic tape MT wound around the winding reel SW2 is wound around the sending reel 22 by the rotation of the sending reel 22. In the winding step, a cutting device (not shown) is used. In a case where a required amount of the magnetic tape MT is wound around the sending reel 22 for each of the plurality of sending reels 22, the magnetic tape MT fed from the winding reel SW2 to the sending reel 22 is cut by the cutting device.

By the way, in a case in which all the servo patterns 52 formed in the servo band SB of the magnetic tape MT manufactured as described above are formed in an ideal shape and are formed in a uniform size and orientation, it is possible to realize high-accuracy tracking control (that is, control of adjusting the position of the magnetic head 28 to be on-track) in accordance with the servo pattern signal obtained by reading the servo pattern 52 by the servo reading element SR.

However, as shown in FIG. 12 as an example, the actual servo pattern 52 is distorted as compared with the ideal servo pattern 52. The servo pattern 52 is preferably recorded in a linear shape by the servo writer SW (FIG. 11), but in fact, the servo pattern 52 is recorded in the servo band SB in a curved shape without being recorded in a linear shape due to the manufacturing error of the servo writer SW, the misregistration of the installation portion of the servo writer SW, the variation in the intensity of the magnetic field released from the servo writer SW, the dirt of the servo writer SW, the vibration applied to the magnetic tape MT during the recording of the servo pattern 52, the expansion and contraction of the magnetic tape MT, the variation in the characteristics of the magnetic layer included in the servo band SB before the servo pattern 52 is recorded, and the like. For convenience of description, the first example and the second example of the servo pattern 52 shown in FIG. 12 schematically show the distortions of the linear magnetization regions 54A1 and 54A2 in an easy-to-understand manner, and are emphasized more than the actual distortions of the linear magnetization regions 54A1 and 54A2.

As shown in the first example and the second example of the servo pattern 52 shown in FIG. 12, the distortion of the linear magnetization regions 54A1 and 54A2 varies due to the servo writer SW, the servo band SB, and/or the magnetic tape MT. This means that the distance between the linear magnetization regions 54A1 and 54A2 in the longitudinal direction LD varies for each path P. In a case in which the distance in the longitudinal direction LD between the linear magnetization regions 54A1 and 54A2 for each path P varies, the accuracy of the tracking control is also reduced, and thus it is difficult for the magnetic head 28 to accurately perform the magnetic processing on each of the processing target division data tracks.

Therefore, in the present embodiment, as shown in FIG. 13 as an example, the unique geometrical characteristic information 56 is used for each magnetic tape cartridge 12. The geometrical characteristic information 56 is information used for each magnetic tape MT accommodated in the magnetic tape cartridge 12. Here, although a form example has been described in which the geometrical characteristic information 56 is determined for each magnetic tape cartridge 12 is described, the concept of determining the geometrical characteristic information 56 for each magnetic tape cartridge 12 also includes a concept of determining the geometrical characteristic information 56 for each servo writer SW involved in the manufacture of the magnetic tape MT accommodated in the magnetic tape cartridge 12. This is because, as described above, the distortion of the linear magnetization regions 54A1 and 54A2 included in the magnetic tape MT varies for each servo writer SW, and the magnetic tape MT in which the influence of the variation for each servo writer SW is applied is accommodated in the magnetic tape cartridge 12.

The geometrical characteristic information 56 is information regarding the geometrical characteristic of the servo pattern 52 in the corresponding magnetic tape MT. The information regarding the geometrical characteristic of the servo pattern 52 refers to, for example, information in which the linearity of the servo pattern 52 is expressed. In the example shown in FIG. 13, as an example of the geometrical characteristic information 56, information in which a servo band number, a servo position number, and a distance D are associated with each other is shown.

The servo band number is a number that can specify the servo band SB in the magnetic tape MT. The servo position number is a number for specifying the servo position. The servo position refers to a position in the servo pattern 52 in the width direction WD (that is, a position of the path P in the servo pattern 52 in the width direction WD). The servo position is determined for each of a plurality of division data tracks (12 division data tracks in the examples shown in FIGS. 8, 9, and 12).

The distance D is information for specifying the geometrical characteristic of the servo pattern 52 at the position specified from the servo position number. In the example shown in FIG. 13, as an example of the distance D, a distance in the longitudinal direction LD between the linear magnetization region 54A1 and the linear magnetization region 54A2 at a position specified from the servo position number (that is, information indicating an interval between the linear magnetization region 54A1 and the linear magnetization region 54A2 in the longitudinal direction LD at the position specified from the servo position number) is shown.

In the present embodiment, the servo position number is an example of "first specification information" according to the technology of the present disclosure. The distance D is an example of "second specification information" and "information indicating the interval between the first linear magnetization region and the second linear magnetization region at the position specified from the first specification information" according to the technology of the present disclosure.

The distance D is measured by the measuring device 58 in a production processof the magnetic tape cartridge 12 (for example, a manufacturing process of the magnetic tape MT). Examples of the measuring device 58 include an MFM, an SEM, and a laser microscope. The measuring device 58 measures the distance D for each servo band SB and each servo position, and outputs the measurement result to the writing device 60.

The writing device 60 includes a computer 60A and a noncontact writing unit 60B. The computer 60A is realized by a processor (for example, a CPU), an NVM, a RAM, and the like. The computer 60A acquires the measurement result output from the measuring device 58 and generates the geometrical characteristic information 56 based on the acquired measurement result.

The noncontact writing unit 60B performs processing of storing information in the cartridge memory 24 (that is, processing of writing information to the cartridge memory 24) in the same manner as the noncontact read/write device 46 (see FIGS. 3 and 4) under the control of the computer 60A. In other words, the computer 60A stores the management information 15 (see FIG. 2) in the cartridge memory 24 by communicating with the cartridge memory 24 in a non-contact manner via the noncontact writing unit 60B. In the example shown in FIG. 13, an example of an aspect in which the geometrical characteristic information 56, which is one piece of information included in the management information 15, is stored in the cartridge memory 24 is shown.

As shown in FIG. 14 as an example, the processing device 30 included in the magnetic tape drive 14 executes the information management processing. The processing device 30 includes a first acquisition unit 30A and a first control unit 30B. The information management processing is realized by the operation of the first acquisition unit 30A and the first control unit 30B.

In a case where the magnetic tape cartridge 12 is loaded into the magnetic tape drive 14 (see FIGS. 1 and 3), the first acquisition unit 30A acquires the geometrical characteristic information 56 from the cartridge memory 24 in the magnetic tape cartridge 12 loaded into the magnetic tape drive 14. The geometrical characteristic information 56 is acquired by the first acquisition unit 30A from the cartridge memory 24 via the noncontact read/write device 46 (see FIGS. 3 and 4).

The first control unit 30B controls the transport device 26 and the like to extract the magnetic tape MT from the magnetic tape cartridge 12 and to make the magnetic tape MT travel in the forward direction along the predetermined path. In a state in which the magnetic tape MT is traveling in the forward direction along the predetermined path, the first control unit 30B calculates a specific servo position SSP (for example, a position specified from the servo position number "2") determined in accordance with the reading result by the servo reading element SR with respect to the servo pattern 52 in the servo band SB adjacent to the specific data band DB in the width direction WD. Examples of the specific data band SB include a data band SB determined by default and a data band SB designated via the UI system device 29. The specific servo position SSP is an example of a "position determined in accordance with a reading result of the servo pattern by the magnetic head" according to the technology of the present disclosure.

In the magnetic tape drive 14, the distance D is calculated from the reading result of the servo pattern 52 by the servo reading element SR, and the tracking control is performed in accordance with the distance D. The distance D calculated by the magnetic tape drive 14 is an independent variable included in an arithmetic expression (for example, Expression (1)) used to calculate which servo position the position of the servo reading element SR corresponds to. The servo position corresponding to the position of the servo reading element SR is calculated according to the following Expression (1). Expression (1) is an arithmetic expression including independent variables of the distance D, the "middle point distance", and the "2×tan azimuth angle", and a dependent variable of the "servo position". The "middle point distance" is a distance between the linear magnetization region 54A1 and the linear magnetization region 54A2 in the longitudinal direction LD at the middle point of the servo pattern 52. The position at the middle point of the servo pattern 52 refers to a position of the middle point of the servo pattern 52 in the width direction WD. The "azimuth angle" is the predetermined angle (that is, the angle at which the linear magnetization regions 54A1 and 54A2 shown in FIG. 6 are inclined in opposite directions on the longitudinal direction LD side of the magnetic tape MT with the imaginary straight line C1 as a symmetry axis). From Expression (1), the servo position is calculated by a distance in the width direction WD with respect to a position of a middle point of the servo pattern 52 in the width direction WD.

$$\text{servo position} = \frac{\text{middle point distance} - \text{distance } D}{2 \times \tan \text{ azimuth angle}} \qquad (1)$$

The specific servo position SSP is calculated by, for example, the first control unit 30B as follows. First, the first control unit 30B calculates the distance D from the reading result by the servo reading element SR with respect to the servo pattern 52 in the servo band SB adjacent in the width direction WD to the specific data band SB. Both the middle point distance and the azimuth angle are predetermined standard values of the ideal servo pattern 52. For example, the middle point distance and the azimuth angle are stored in the storage 32, and the first control unit 30B acquires the middle point distance and the azimuth angle from the storage 32. Then, the first control unit 30B calculates the specific servo position SSP by applying the distance D, the middle point distance, and the azimuth angle to Expression (1).

The first control unit 30B controls the magnetic head 28 to record the geometrical characteristic information 56 acquired by the first acquisition unit 30A in the specific data track SDT corresponding to the specific servo position SSP. The specific data track SDT is an example of a "recording position" according to the technology of the present disclosure.

The specific data track SDT is a division data track corresponding to the specific servo position SSP, and is present for each data track DT (see FIG. 7) in the specific data band SB. The specific data track SDT is one division data track uniquely specified from the specific servo position SSP among a plurality of division data tracks in the data track DT.

Here, although a form example has been described in which the specific data track SDT is present for each of the plurality of data tracks DT is described, this is merely an example, and the specific data track SDT may be present in one or more designated data tracks DT.

As shown in FIG. 15 as an example, the geometrical characteristic information 56 stored in the cartridge memory 24 is roughly divided into first geometrical characteristic information 56A and second geometrical characteristic information 56B. The first geometrical characteristic information 56A is geometrical characteristic information 56 other than the second geometrical characteristic information 56B in the geometrical characteristic information 56 stored in the cartridge memory 24. The second geometrical characteristic information 56B is geometrical characteristic information 56 in which the specific data track SDT can be specified among the geometrical characteristic information 56 stored in the cartridge memory 24.

After the geometrical characteristic information 56 (that is, all of the geometrical characteristic information 56) is recorded in the specific data track SDT by the magnetic head 28 (see FIG. 14), the first control unit 30B erases the first geometrical characteristic information 56A from the geometrical characteristic information 56 stored in the cartridge memory 24 to leave the second geometrical characteristic information 56B in the cartridge memory 24. For example, in a case in which the servo position number corresponding to the specific servo position SSP is "2", the first control unit 30B erases information related to the servo position number other than the servo position number "2" as the first geometrical characteristic information 56A.

By the way, in a case where the magnetic processing is performed on the processing target division data track, high-accuracy tracking control is required. In order to realize the high-accuracy tracking control, it is effective to use the geometrical characteristic information 56 determined for each magnetic tape MT. This is because the geometrical characteristic information 56 is information in which the servo band number, the servo position number, and the distance D are associated with each other, and the servo reading element SR can be specified on which servo position the servo reading element SR is located by referring to the geometrical characteristic information 56.

Therefore, in the present embodiment, as an example, as shown in FIG. 16, in a case where the magnetic processing is performed on the processing target division data track in a state in which the second geometrical characteristic information 56B is left in the cartridge memory 24 by erasing the first geometrical characteristic information 56A from the cartridge memory 24, the recording and reproducing execution processing is performed by the processing device 30. The processing device 30 includes a second acquisition unit 30C and a second control unit 30D. The recording and reproducing execution processing is realized by operating the second acquisition unit 30C and the second control unit 30D.

The second acquisition unit 30C acquires the second geometrical characteristic information 56B from the cartridge memory 24 via the noncontact read/write device 46. The second control unit 30D specifies the specific data track SDT in accordance with the second geometrical characteristic information 56B acquired by the second acquisition unit 30C. Then, the second control unit 30D reads out the geometrical characteristic information 56 from the specified specific data track SDT through the magnetic head 28.

The second control unit 30D performs the magnetic processing on the processing target division data track by using the magnetic head 28 in accordance with the geometrical characteristic information 56 and the servo pattern 52. That is, the second control unit 30D specifies the processing target division data track based on the geometrical characteristic information 56 read out from the specific data track SDT and the distance D obtained from the reading result of the servo pattern 52 by the servo reading element SR, and performs the magnetic processing on the specified processing target division data track by using the magnetic head 28.

For example, the second control unit 30D specifies the servo position corresponding to the distance D obtained from the reading result of the servo pattern 52 by the servo reading element SR with reference to the geometrical characteristic information 56 read out from the specific data track SDT, and determines whether or not the specified servo position matches the servo position corresponding to the processing target division data track. In a case in which it is determined that the servo position specified with reference to the geometrical characteristic information 56 matches the servo position corresponding to the processing target division data track, the data read/write element DRW is in a state of being registered on the processing target division data track. In this state, the second control unit 30D performs the magnetic processing on the processing target division data track by using the data read/write element DRW.

Next, the action of the magnetic tape drive 14 will be described with reference to FIGS. 17 and 18.

FIG. 17 shows an example of a flow of the information management processing performed by the processing device 30. The flow of the information management processing shown in FIG. 17 is an example of an "information management method" according to the technology of the present disclosure. Here, for convenience of description, a case where the information management processing shown in FIG. 17 is performed by the processing device 30 in a state in which the magnetic tape MT travels along the predetermined path in the forward direction will be described.

In the information management processing shown in FIG. 17, first, in step ST10, the first acquisition unit 30A acquires the geometrical characteristic information 56 from the cartridge memory 24 via the noncontact read/write device 46. After the processing of step ST10 is executed, the information management processing shifts to step ST12.

In step ST12, the first control unit 30B controls the magnetic head 28 to record the geometrical characteristic information 56 acquired in step ST10 in the specific data track SDT. After the processing of step ST12 is executed, the information management processing proceeds to step ST14.

In step ST14, the first control unit 30B erases the first geometrical characteristic information 56A from the geometrical characteristic information 56 stored in the cartridge memory 24 to leave the second geometrical characteristic information 56B corresponding to the specific servo position SSP in the cartridge memory 24. After the processing of step ST14 is executed, the information management processing ends.

FIG. 18 shows an example of a flow of recording and reproducing execution processing performed by the processing device 30. Here, for convenience of description, a case where the information management processing shown in FIG. 17 is executed, and the recording and reproducing execution processing shown in FIG. 18 is performed by the processing device 30 in a state in which the magnetic tape MT travels along the predetermined path in the forward direction will be described.

In the recording and reproducing execution processing shown in FIG. 18, first, in step ST20, the second acquisition unit 30C acquires the second geometrical characteristic information 56B from the cartridge memory 24 via the noncontact read/write device 46. After the processing of step ST20 is executed, the recording and reproducing execution processing proceeds to step ST22.

In step ST22, the second control unit 30D specifies the specific data track SDT (that is, the division data track corresponding to the specific servo position SSP) with reference to the second geometrical characteristic information 56B acquired in step ST20. After the processing of step ST22 is executed, the recording and reproducing execution processing proceeds to step ST24.

In step ST24, the second control unit 30D controls the magnetic head 28 to read out the geometrical characteristic information 56 from the specific data track SDT specified in step ST22. After the processing of step ST24 is executed, the recording and reproducing execution processing proceeds to step ST26.

In step ST26, the second control unit 30D performs the magnetic processing (that is, the recording processing and/or the reproducing processing) on the processing target division data track by using the magnetic head 28 in accordance with the geometrical characteristic information 56 read out from the specific data track SDT in step ST24 and the servo pattern 52 read by the servo reading element SR. After the processing of step ST26 is executed, the recording and reproducing execution processing ends.

As described above, in the present embodiment, the geometrical characteristic information 56 is stored in the cartridge memory 24 provided in the magnetic tape cartridge 12. The geometrical characteristic information 56 is information (for example, information in which linearity of the servo pattern 52 is expressed) regarding the geometrical characteristic of the servo pattern 52 formed on the magnetic tape MT accommodated in the magnetic tape cartridge 12. In a case where the magnetic tape cartridge 12 is loaded into the magnetic tape drive 14, the geometrical characteristic information 56 is acquired from the cartridge memory 24 by the first acquisition unit 30A, and the geometrical characteristic information 56 is recorded in the specific data track SDT by the first control unit 30B via the magnetic head 28. In a case in which the geometrical characteristic information 56 is recorded in the specific data track SDT, the first geometrical characteristic information 56A is erased by the first control unit 30B from the geometrical characteristic information 56 stored in the cartridge memory 24. As a result, the second geometrical characteristic information 56B is left in the cartridge memory 24. The second geometrical characteristic information 56B is information for specifying the specific data track SDT in which the geometrical characteristic information 56 is recorded in the magnetic tape MT.

Therefore, by using the second geometrical characteristic information 56 remaining in the cartridge memory 24, the position at which the geometrical characteristic information 56 is recorded on the magnetic tape MT, that is, the specific data track SDT can be specified. In addition, it is possible to contribute to an increase in the free capacity of the cartridge memory 24 by the amount of the first geometrical characteristic information 56A erased from the cartridge memory 24.

In addition, in the present embodiment, information in which the servo band number, the servo position number, and the distance D are associated with each other is used as the geometrical characteristic information 56. Therefore, it is possible to easily specify a relationship between the position (that is, the servo position) in the servo pattern 52 with respect to the width direction WD of the magnetic tape MT and the distance D.

In addition, in the present embodiment, the geometrical characteristic information 56 acquired in the production process of the magnetic tape cartridge 12 is stored in the cartridge memory 24. Then, the information regarding the geometrical characteristic of the servo pattern 52 in the production process of the magnetic tape cartridge 12 is recorded on the magnetic tape MT as geometrical characteristic information 56. Therefore, the magnetic tape drive 14 can perform the tracking control in consideration of the geometrical characteristic of the servo pattern 52 in the production process of the magnetic tape cartridge 12 by referring to the geometrical characteristic information 56. As a result, the data read/write element DRW is registered with the processing target division data track with high accuracy.

In addition, in the present embodiment, in a case in which the magnetic processing is performed on the magnetic tape MT by using the magnetic head 28 in a state in which the second geometrical characteristic information 56B remains in the cartridge memory 24, the specific data track SDT is specified in accordance with the second geometrical characteristic information 56B remaining in the cartridge memory 24. Then, the geometrical characteristic information 56 is read out from the specific data track SDT by the magnetic head 28. Therefore, the magnetic tape drive 14 can accurately perform the registration of the magnetic head 28 with respect to the magnetic tape MT in a case of performing the magnetic processing using the magnetic head 28 by using the geometrical characteristic information 56. As a result, the magnetic processing of the magnetic tape MT using the magnetic head 28 is also performed with high accuracy.

Modification Example

In the above-described embodiment, the first control unit 30B specifies the specific servo position SSP by using Expression (1), and records the geometrical characteristic information 56 on the specific data track SDT corresponding to the specified specific servo position SSP by using the magnetic head 28, but the technology of the present disclosure is not limited to this. For example, the first control unit 30B may specify the specific servo position SSP with reference to the geometrical characteristic information 56 acquired from the cartridge memory 24 by the first acquisition unit 30A, and record the geometrical characteristic information 56 on the specific data track SDT corresponding to the specified specific servo position SSP by using the magnetic head 28.

More specifically, for example, first, the first control unit 30B acquires the distance D corresponding to the designated servo position number (that is, the servo position number at which the specific data track SDT can be specified) from the geometrical characteristic information 56. Next, the first control unit 30B compares the distance D acquired from the geometrical characteristic information 56 with the reading result of the servo pattern 52 by the servo reading element SR, and specifies the specific data track SDT with reference to the comparison result. Then, the first control unit 30B performs control of recording the geometrical characteristic information 56 in the specific data track SDT by the magnetic head 28.

In the above-described embodiment, the form example has been described in which the geometrical characteristic information 56 is stored in the cartridge memory 24, but the technology of the present disclosure is not limited to this, and the geometrical characteristic information 56 may be stored in any of the plurality of storage blocks in the cartridge memory 24.

In this case, as shown in FIG. 19 as an example, the cartridge memory 24 includes a first storage block 24A, a second storage block 24B, and a third storage block 24C. Here, the first storage block 24A, the second storage block 24B, and the third storage block 24C are examples of a "plurality of storage blocks" according to the technology of the present disclosure. In addition, the third storage block 24C is an example of a "first storage region" according to the technology of the present disclosure. In addition, the second storage block 24B is an example of a "second storage region" according to the technology of the present disclosure.

Each of the first storage block 24A, the second storage block 24B, and the third storage block 24C is further divided into a plurality of storage blocks. For example, the first storage block 24A has a capacity of about 512 bytes, the second storage block 24B has a capacity of about 32 to 64 bytes, and the third storage block 24C has a capacity of about 1 kilobyte to 20 kilobytes.

For example, the first storage block 24A stores information (for example, information indicating the specification of the cartridge memory 24) other than the geometrical characteristic information 56 in the management information 15. Information is not stored in the second storage block 24B. The geometrical characteristic information 56 is stored in the third storage block 24C.

After the geometrical characteristic information 56 is recorded in the specific data track SDT by the magnetic head 28 (see FIG. 14), the first control unit 30B transfers the second geometrical characteristic information 56B to the second storage block 24B via the noncontact read/write device 46. Then, the first control unit 30B erases the first geometrical characteristic information 56A from the third storage block 24C via the noncontact read/write device 46. As a result, similarly to the above-described embodiment, only the second geometrical characteristic information 56B among the geometrical characteristic information 56 remains in the cartridge memory 24. The first geometrical characteristic information 56A is erased from the third storage block 24C. After the first geometrical characteristic information 56A is erased from the third storage block 24C, the first control unit 30B stores other information (that is, information other than the geometrical characteristic information 56) in the third storage block 24C.

As described above, by transferring the second geometrical characteristic information 56B from the third storage block 24C to the second storage block 24B, it is possible to suppress the disappearance of the second geometrical characteristic information 56B. In addition, since the first geometrical characteristic information 56A is erased from the third storage block 24C, it is possible to store other information in the third storage block 24C by the amount of the first geometrical characteristic information 56A erased.

It should be noted that the form example in which the other information is stored in the third storage block 24C after the first geometrical characteristic information 56A is erased from the third storage block 24C is merely an example, and the first geometrical characteristic information 56A may be erased from the third storage block 24C by overwriting the other information in the third storage block 24C in a state in which the first geometrical characteristic information 56A remains in the third storage block 24C. Accordingly, it is possible to simultaneously advance the storage of the information other than the geometrical characteristic information 56 in the third storage block 24C and the erasure of the first geometrical characteristic information 56A from the third storage block 24C.

In the above embodiment, the form example has been described in which the geometrical characteristic information 56 acquired in the production process of the magnetic tape cartridge 12 is stored in the cartridge memory 24, but the technology of the present disclosure is not limited to this. For example, the distance D of the servo pattern 52 may be measured in some process (for example, an inspection process, a shipping process, a storage process, or a maintenance process) after the production process of the magnetic tape cartridge 12 is completed, and the geometrical characteristic information 56 including the measured distance D may be stored in the cartridge memory 24. In the above-described embodiment, the measurement using MFM, SEM, a laser microscope, or the like has been exemplified, but the technology of the present disclosure is not limited thereto. For example, in some process after the production process of the magnetic tape cartridge 12 is completed, the distance D may be calculated from the reading result (for example, the servo signal) of the servo reading element SR with respect to the servo pattern 52 by using the reference magnetic tape drive 14.

In the above embodiment, the information in which the servo band number, the servo position number, and the distance D are associated with each other is illustrated as the geometrical characteristic information 56, but the technology of the present disclosure is not limited to this. For example, as shown in FIG. 20, the technology of the present disclosure is established even in a case in which geometrical characteristic information 62 is applied instead of the geometrical characteristic information 56, and the same effects as those of the above-described embodiment can be obtained. The geometrical characteristic information 62 is information in which a servo band number, a servo position number, and deviation amount information 62A are associated with each other. The deviation amount information 62A is information indicating the deviation amount. The deviation amount refers to a value obtained by subtracting the reference interval from the distance D. An example of the reference interval is a middle point distance. However, the middle point distance is merely an example, and may be a distance in the longitudinal direction LD between the linear magnetization region 54A1 and the linear magnetization region 54A2 at a servo position specified from a specific servo position number (for example, a servo position specified from the servo position number "0"). Here, the deviation amount information 62A is an example of "information indicating a deviation amount" according to the technology of the present disclosure.

In the above-described embodiment, a method of discriminating between the first state in which all the geometrical characteristic information 56 is stored in the cartridge memory 24 and the second state in which the first geometrical characteristic information 56A is erased from the cartridge memory 24 and the second geometrical characteristic information 56B is left in the cartridge memory 24 is not described. However, for example, as shown in FIG. 21, the first state and the second state may be discriminated from the first information 64 and the second information 66.

The first information 64 is information that can specify the first state. The second information 66 is information for specifying the second state. Here, the first information 64 is an example of "first information" according to the technology of the present disclosure, and the second information 66 is an example of "second information" according to the technology of the present disclosure.

The processing device 30 selectively stores the first information 64 and the second information 66 in the cartridge memory 24. That is, the processing device 30 stores the first information 64 of the first information 64 and the second information 66 in the cartridge memory 24 in a case where the cartridge memory 24 is in the first state, and stores the second information 66 of the first information 64 and the second information 66 in the cartridge memory 24 in a case where the cartridge memory 24 is in the second state. Examples of the first information 64 and the second information 66 include a flag represented by "0" or "1".

In this way, by selectively storing the first information 64 and the second information 66 in the cartridge memory 24, it is possible to easily specify whether the cartridge memory 24 is in the first state or the cartridge memory 24 is in the second state. In addition, since the first information 64 and the second information 66 are selectively stored in the cartridge memory 24, it is also possible to easily specify whether or not the geometrical characteristic information 56 is recorded on the magnetic tape MT.

In the above-described embodiment, the magnetic tape system 10 has been described in which the magnetic tape cartridge 12 can be inserted and removed with respect to the magnetic tape drive 14, but the technology of the present disclosure is not limited to this. For example, even in a case of the magnetic tape system in which at least one magnetic tape cartridge 12 is loaded in advance into the magnetic tape drive 14 (that is, the magnetic tape system in which at least one magnetic tape cartridge 12 and the magnetic tape drive 14 or the magnetic tape MT are integrated in advance (for example, before the data is recorded in the data band DB)), the technology of the present disclosure is established.

In the above-described embodiment, the single magnetic head 28 has been described, but the technology of the present disclosure is not limited to this. For example, a plurality of magnetic heads 28 may be disposed on the magnetic tape MT. For example, the magnetic head 28 for reading and at least one magnetic head 28 for writing may be disposed on the magnetic tape MT. The magnetic head 28 for reading may be used for verifying the data recorded on the data band DB by the magnetic head 28 for writing. In addition, one magnetic head on which the magnetic element unit 42 for reading and at least one magnetic element unit 42 for writing are mounted may be disposed on the magnetic tape MT.

In the above-described embodiment, although the form example has been described in which the processing device 30 (see FIG. 3) is realized by the ASIC has been described, the technology of the present disclosure is not limited to this, and for example, the processing device 30 may be realized by a processor other than the ASIC, such as a CPU, or may be realized by a plurality of types of processors. For example, in a case where the processing device 30 is realized by a CPU, the information management processing program and/or the recording and reproducing execution processing program may be stored in the storage 32, and the CPU may be caused to operate as the first acquisition unit 30A and the first control unit 30B by executing the information management processing program and may be caused to operate as the second acquisition unit 30C and the second control unit 30D by executing the recording and reproducing execution processing program.

The information management processing program and/or the recording and reproducing execution processing program may be stored in a portable storage medium (for example, an SSD or a USB memory) that is a computer-readable non-transitory storage medium. The information management processing program and/or the recording and reproducing execution processing program may be stored in a storage device, such as a server, via a communication network (not shown). In this case, for example, the information management processing program and/or the recording and reproducing execution processing program is downloaded in response to a request from the processing device 30 and is installed in the processing device 30.

As the hardware resource for executing the information management processing and/or the recording and reproducing execution processing, various processors shown below can be used. Examples of the processor include the CPU which is a general-purpose processor functioning as the hardware resource for executing the processing by executing software, that is, a program. In addition, examples of the processor include a dedicated electronic circuit which is a processor having a circuit configuration designed to be dedicated to executing specific processing, such as an FPGA, a PLD, or an ASIC described as an example. A memory is incorporated or connected to any processor, and any processor executes the information management processing and/or the recording and reproducing execution processing by using the memory.

The hardware resource for executing the information management processing and/or the recording and reproducing execution processing may be composed of one of the various processors or be composed of a combination of two or more processors of the same type or different types (for example, a combination of a plurality of FPGAs or a combination of a CPU and an FPGA). In addition, the hardware resource for executing the information management processing and/or the recording and reproducing execution processing may be one processor.

As an example of the configuration with one processor, first, there is a form in which one processor is configured by a combination of one or more CPUs and software, and this processor functions as a hardware resource for executing the information management processing and/or the recording and reproducing execution processing. Second, as represented by SoC or the like, there is a form in which a processor that realizes the functions of the entire system including a plurality of hardware resources for executing the information management processing and/or the recording and reproducing execution processing with one IC chip is used. As described above, the information management processing and/or the recording and reproducing execution processing is realized by using one or more of the various processors as the hardware resource.

Further, as the hardware structure of these various processors, more specifically, it is possible to use an electronic circuit in which circuit elements, such as semiconductor elements, are combined.

In addition, the information management processing and the recording and reproducing execution processing are merely examples. Accordingly, it is possible to delete an unnecessary step, add a new step, or change a processing order without departing from the gist of the present disclosure.

The content of the above description and the content of the drawings are detailed explanations of the parts relating to the technology of the present disclosure, and are merely examples of the technology of the present disclosure. For example, description related to the above configurations, functions, actions, and effects is description related to an example of configurations, functions, actions, and effects of the parts relating to the technology of the present disclosure. Thus, it is needless to say that unnecessary parts may be deleted, new elements may be added, or replacement may be made to the content of the above description and the content of the drawings without departing from the gist of the technology of the present disclosure. In order to avoid complication and easily understand the parts relating to the technology of the present disclosure, in the content of the above description and the content of the drawings, the description regarding common general technical knowledge which is not necessarily particularly described in terms of embodying the technology of the present disclosure is omitted.

In the present specification, "A and/or B" is synonymous with "at least one of A or B". That is, "A and/or B" may refer to A alone, B alone, or a combination of A and B. In addition, in the present specification, in a case where three or more matters are expressed with the connection of "and/or", the same concept as "A and/or B" is applied.

All documents, patent applications, and technical standards mentioned in the present specification are incorporated herein by reference to the same extent as in a case in which each document, each patent application, and each technical standard are specifically and individually described by being incorporated by reference.

What is claimed is:

1. A magnetic tape drive used for a magnetic tape cartridge including a magnetic tape on which a servo pattern is recorded, and a storage medium other than the magnetic tape, in which information is capable of being stored and acquired in a non-contact manner, the magnetic tape drive comprising:

a processor; and a magnetic head controlled by the processor, wherein geometrical characteristic information, which is information regarding a geometrical characteristic of the servo pattern, is stored in the storage medium, the processor is configured to:

perform control of recording the geometrical characteristic information stored in the storage medium on the magnetic tape by the magnetic head at a position determined in accordance with a reading result of the servo pattern by the magnetic head; and leave second geometrical characteristic information in the storage medium by erasing first geometrical characteristic information from the geometrical characteristic information stored in the storage medium, the second geometrical characteristic information is geometrical characteristic information capable of specifying a recording position in the magnetic tape at which the geometrical characteristic information is recorded, of the geometrical characteristic information stored in the storage medium, and the first geometrical characteristic information is geometrical characteristic information other than the second geometrical characteristic information of the geometrical characteristic information stored in the storage medium.

2. A magnetic tape drive used for a magnetic tape cartridge including a magnetic tape on which a servo pattern is recorded, and a storage medium other than the magnetic tape, in which information is capable of being stored and acquired in a non-contact manner, the magnetic tape drive comprising:

a processor; and a magnetic head controlled by the processor, wherein geometrical characteristic information, which is information regarding a geometrical characteristic of the servo pattern, is stored in the storage medium, the geometrical characteristic information, which is stored in the storage medium, is recorded in the magnetic tape, the processor is configured to:

leave second geometrical characteristic information in the storage medium by erasing first geometrical characteristic information from the geometrical characteristic information stored in the storage medium, the second geometrical characteristic information is geometrical characteristic information capable of specifying a recording position in the magnetic tape at which the geometrical characteristic information is recorded, of the geometrical characteristic information stored in the storage medium, and the first geometrical characteristic information is geometrical characteristic information other than the second geometrical characteristic information of the geometrical characteristic information stored in the storage medium.

3. The magnetic tape drive according to claim 1, wherein the geometrical characteristic information is information regarding a geometrical characteristic of the servo pattern acquired in a production process of the magnetic tape cartridge.

4. The magnetic tape drive according to claim 1, wherein, in a case where recording processing and/or reproducing processing using the magnetic head is performed on the magnetic tape by the processor in a state in which the first geometrical characteristic information is erased from the storage medium and the second geometrical characteristic information remains in the storage medium, and the processor is configured to:

specify the recording position in accordance with the second geometrical characteristic information remaining in the storage medium;

perform control of reading out the geometrical characteristic information from the specified recording position by the magnetic head; and perform the recording processing and/or the reproducing processing in accordance with the geometrical characteristic information read out by the magnetic head from the recording position and the servo pattern.

5. The magnetic tape drive according to claim 1, wherein the storage medium has a plurality of storage regions including a first storage region and a second storage region, the geometrical characteristic information is stored in the first storage region, and the processor is configured to:

transfer the second geometrical characteristic information from the first storage region to the second storage region.

6. The magnetic tape drive according to claim 5, wherein the processor is configured to:

erase the first geometrical characteristic information from the first storage region.

7. The magnetic tape drive according to claim 6, wherein the processor is configured to:

erase the first geometrical characteristic information from the first storage region by overwriting the first storage region.

8. The magnetic tape drive according to claim 1, wherein the geometrical characteristic information is information in which linearity of the servo pattern is represented.

9. The magnetic tape drive according to claim 1, wherein the geometrical characteristic information includes information in which first specification information capable of specifying a position in the servo pattern in a width direction of the magnetic tape and second specification information capable of specifying the geometrical characteristic at the position specified from the first specification information are associated with each other.

10. The magnetic tape drive according to claim 9,
wherein the servo pattern is at least one linear magneti-
zation region pair,
the linear magnetization region pair is a first linear
magnetization region that is linearly magnetized and a
second linear magnetization region that is linearly
magnetized,
the first linear magnetization region and the second linear
magnetization region are inclined in opposite directions
with respect to an imaginary straight line along the
width direction of the magnetic tape, and
the second specification information is information indi-
cating an interval between the first linear magnetization
region and the second linear magnetization region at a
position specified from the first specification informa-
tion.

11. The magnetic tape drive according to claim 9,
wherein the servo pattern is at least one linear magneti-
zation region pair,
the linear magnetization region pair is a first linear
magnetization region that is linearly magnetized and a
second linear magnetization region that is linearly
magnetized,
the first linear magnetization region and the second linear
magnetization region are inclined in opposite directions
with respect to an imaginary straight line along the
width direction of the magnetic tape, and
the second specification information is information indi-
cating a deviation amount from a reference interval
between the first linear magnetization region and the
second linear magnetization region at a position speci-
fied from the first specification information.

12. The magnetic tape drive according to claim 1,
wherein the storage medium selectively stores first infor-
mation capable of specifying that all of the geometrical
characteristic information is stored, and second infor-
mation capable of specifying that, of the geometrical
characteristic information, the first geometrical charac-
teristic information is erased and the second geometri-
cal characteristic information remains.

13. A magnetic tape cartridge comprising:
a magnetic tape on which a servo pattern is recorded; and
a storage medium other than the magnetic tape, in which
information is capable of being stored and acquired in
a non-contact manner,
wherein geometrical characteristic information, which is
information regarding a geometrical characteristic of
the servo pattern, is stored in the storage medium,
the geometrical characteristic information stored in the
storage medium is recorded on the magnetic tape by a
magnetic head at a position determined in accordance
with a reading result of the servo pattern by the
magnetic head,
second geometrical characteristic information is left in the
storage medium by erasing first geometrical character-
istic information from the geometrical characteristic
information stored in the storage medium,
the second geometrical characteristic information is geo-
metrical characteristic information capable of specify-
ing a recording position in the magnetic tape at which
the geometrical characteristic information is recorded,
of the geometrical characteristic information stored in
the storage medium, and
the first geometrical characteristic information is geo-
metrical characteristic information other than the second geometrical characteristic information of the geo-
metrical characteristic information stored in the storage
medium.

14. A magnetic tape cartridge comprising:
a magnetic tape on which a servo pattern is recorded; and
a storage medium other than the magnetic tape, in which
information is capable of being stored and acquired in
a non-contact manner,
wherein geometrical characteristic information, which is
information regarding a geometrical characteristic of
the servo pattern, is stored in the storage medium,
the geometrical characteristic information stored in the
storage medium is recorded on the magnetic tape,
second geometrical characteristic information is left in the
storage medium by erasing first geometrical character-
istic information from the geometrical characteristic
information stored in the storage medium,
the second geometrical characteristic information is geo-
metrical characteristic information capable of specify-
ing a recording position in the magnetic tape at which
the geometrical characteristic information is recorded,
of the geometrical characteristic information stored in
the storage medium, and
the first geometrical characteristic information is geo-
metrical characteristic information other than the sec-
ond geometrical characteristic information of the geo-
metrical characteristic information stored in the storage
medium.

15. An information management method of a magnetic
tape cartridge including a magnetic tape on which a servo
pattern is recorded, and a storage medium other than the
magnetic tape, in which information is capable of being
stored and acquired in a non-contact manner, in which
geometrical characteristic information which is information
regarding a geometrical characteristic of the servo pattern, is
stored in the storage medium, the information management
method comprising:
performing control of recording the geometrical charac-
teristic information stored in the storage medium on the
magnetic tape by a magnetic head at a position deter-
mined in accordance with a reading result of the servo
pattern by the magnetic head; and
leaving second geometrical characteristic information in
the storage medium by erasing first geometrical char-
acteristic information from the geometrical character-
istic information stored in the storage medium,
wherein the second geometrical characteristic information
is geometrical characteristic information capable of
specifying a recording position in the magnetic tape at
which the geometrical characteristic information is
recorded, of the geometrical characteristic information
stored in the storage medium, and
the first geometrical characteristic information is geo-
metrical characteristic information other than the sec-
ond geometrical characteristic information of the geo-
metrical characteristic information stored in the storage
medium.

16. An information management method of a magnetic
tape cartridge including a magnetic tape on which a servo
pattern is recorded, and a storage medium other than the
magnetic tape, in which information is capable of being
stored and acquired in a non-contact manner, in which
geometrical characteristic information which is information
regarding a geometrical characteristic of the servo pattern, is
stored in the storage medium, the information management
method comprising:

recording, on the magnetic tape, the geometrical charac-
teristic information stored in the storage medium; and
leaving second geometrical characteristic information in
the storage medium by erasing first geometrical char-
acteristic information from the geometrical characteristic information stored in the storage medium,
wherein the second geometrical characteristic information
is geometrical characteristic information capable of
specifying a recording position in the magnetic tape at
which the geometrical characteristic information is
recorded, of the geometrical characteristic information
stored in the storage medium, and
the first geometrical characteristic information is geo-
metrical characteristic information other than the sec-
ond geometrical characteristic information of the geometrical characteristic information stored in the storage
medium.

\* \* \* \* \*